United States Patent [19]
Bunney et al.

[11] Patent Number: 6,003,032
[45] Date of Patent: Dec. 14, 1999

[54] DATA COMMUNICATION SYSTEM

[75] Inventors: William Bunney, Köln; Kozo Tetsuya, Meerbusch, both of Germany

[73] Assignee: Sony International (Europe) GmbH, Cologne, Germany

[21] Appl. No.: 08/989,314

[22] Filed: Dec. 12, 1997

[30] Foreign Application Priority Data

Dec. 12, 1996 [EP] European Pat. Off. .............. 96309036

[51] Int. Cl.⁶ .................................................... G06F 17/30
[52] U.S. Cl. ............................................................ 707/10
[58] Field of Search ........................ 707/1–10, 100–104, 707/200–206, 512, 526, 500, 531; 395/200.33, 200.66; 345/343, 347

[56] References Cited

U.S. PATENT DOCUMENTS

| | | | |
|---|---|---|---|
| 5,491,820 | 2/1996 | Belove et al. | 395/600 |
| 5,623,679 | 4/1997 | Rivette et al. | 707/528 |
| 5,623,681 | 4/1997 | Rivette et al. | 707/522 |
| 5,659,732 | 8/1997 | Kirsch | 707/5 |
| 5,802,493 | 9/1998 | Sheflott et al. | 705/1 |
| 5,802,515 | 9/1998 | Adar et al. | 707/5 |
| 5,822,539 | 10/1998 | Van Hoff | 395/200.66 |
| 5,870,725 | 12/1998 | Rivette et al. | 707/512 |

FOREIGN PATENT DOCUMENTS

| | | |
|---|---|---|
| 718 783 | 6/1996 | European Pat. Off. . |
| 0 718 761 | 6/1996 | European Pat. Off. . |
| 0 733 983 | 9/1996 | European Pat. Off. . |
| WO 95/29451 | 11/1995 | WIPO . |
| WO 96 23265 | 8/1996 | WIPO . |
| WO 96 24213 | 8/1996 | WIPO . |

OTHER PUBLICATIONS

IEEE Network: The Magazine of Computer Communications, vol. 10, No. 2, Mar. 1, 1996, pp. 10–17, XP000580078 Schulzrinne H: "World Wide Web: Whence, Whither, What Next?".

Proceedings of the Annual Conference of the Internet Society in Conjunction with the European Networking Conference, vol. 1, Jan. 1, 1994, pp. 212–01–212–07, XP000567441, Linde P. L.: "HTML and Mosaic: A Taste for More—Use of Hyper Text Mark–up Language (HTML) for the Development of Interactive Multimedia Through World Wide Web (WWW)".

Research Disclosure, No. 349, May 1, 1993, p. 328 XP000377245, "Proactive Hypernet Performance Optimization".

Proceedings of Share Europe Spring Conference, Apr. 18–21, 1994, Brussels, Belgium, pp. 355–368, XP002037682. Francis Heylighen: "World –Wide Web: a distriubted hypermedia paradigm for global networking".

On–Line/CD–ROM Business Information, Apr. 1996, pp. 85–112, XP000602359, "Internet Search Tools".

(List continued on next page.)

*Primary Examiner*—Ruay Lian Ho
*Attorney, Agent, or Firm*—Frommer Lawrence & Haug, LLP.; William S. Frommer

[57] ABSTRACT

A server computer for a data communication system and adapted to transmit a document via a network, such as the Internet or an intranet, to a client computer in response to a request. The server includes an article memory for storing a plurality of article documents and respective bibliographic data; processing circuitry for receiving from a system administrator and storing an article document selection rule, and for retrieving from the article memory a subset of the plurality of article documents and assembling a table of contents-type document from at least part of each of the subset of article documents. The subset of article documents is selected according to the respective bibliographic data using the article document selection rule. Transmission circuitry is responsive to the request for transmitting the assembled document onto the network for delivery to the client computer.

23 Claims, 20 Drawing Sheets

OTHER PUBLICATIONS

International Journal of Modern Physics C, vol. 5, No. 4, Aug. 1994, pp. 899–905, XP002037683 Francesco Ruggiero, Reinier Val Kleij: "On–Line Hypermedia Newspapers: An Experiment With L'Unione Sarda".

Computer Networks and ISDN Systems, No. 28, May 1996, pp. 1335–1344, P002037535, Fred Douglis, Thomas Ball, Yih–Farn Chen, Eleftherios Koutsofios: "WebGuide: Querying and navigating changes in Web repositories".

USENIX Technical Conference, Jan. 22, 1996, pp. 165–176, XP000616939, Douglis F. et al.: "Tracking and Viewing Changes on the Web".

Computer Networks and ISDN Systems, No. 28, May 1996, pp. 1493–1499, XP002037594, Youdji Kohda, Susumu Endo: "Ubiquitous advertising on the WWW: Merging advertising on the brouser".

Multiple Facets of Integration, San Francisco, Jun. 3–7, 1990, vol. 3, No. Conf. 9, Jun. 3, 1990, Institute of Electrical and Electronic Engineers, pp. 1046–1053, XP000164339, Bussey H. E. et al.: "Service Architecture, Prototype Description, and Network Implications of a Personalized Information Grazing Service".

Proceedings of the First International Conference on the Practical Application of Intelligent Agents and Multi–Agent Technology, Apr. 22–24, 1996, London, U.K., pp. 169–179, XP002037595, Anders Falk, Ing–Marie Jonsson: "PAWS: an agent for WWW–retrieval and filtering".

USENIX Technical Conference, Jan. 16, 1995, pp. 177–186, XP000617276, Tak W. Yan et al.: "SIFT—A Tool For Wide–Area Information Dissemination".

Proceedings. International Conference on Tools with Artificial Intelligence, Jan. 1, 1995, pp. 492–495, XP000567438, Pazzani M. et al.: "Learning From Hotlists and Coldlists: Towards A WWW Information Filtering and Seeking Agent".

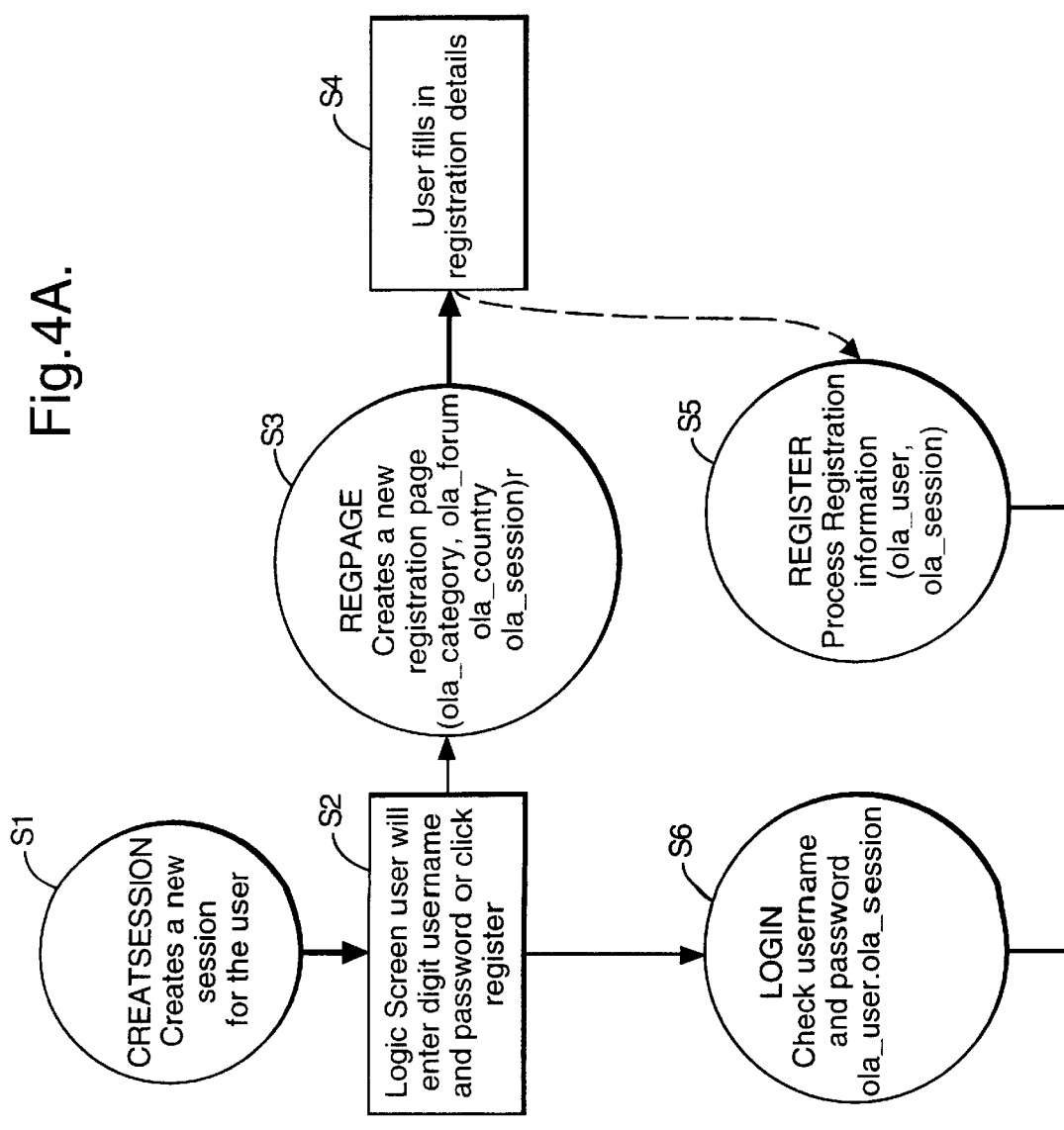

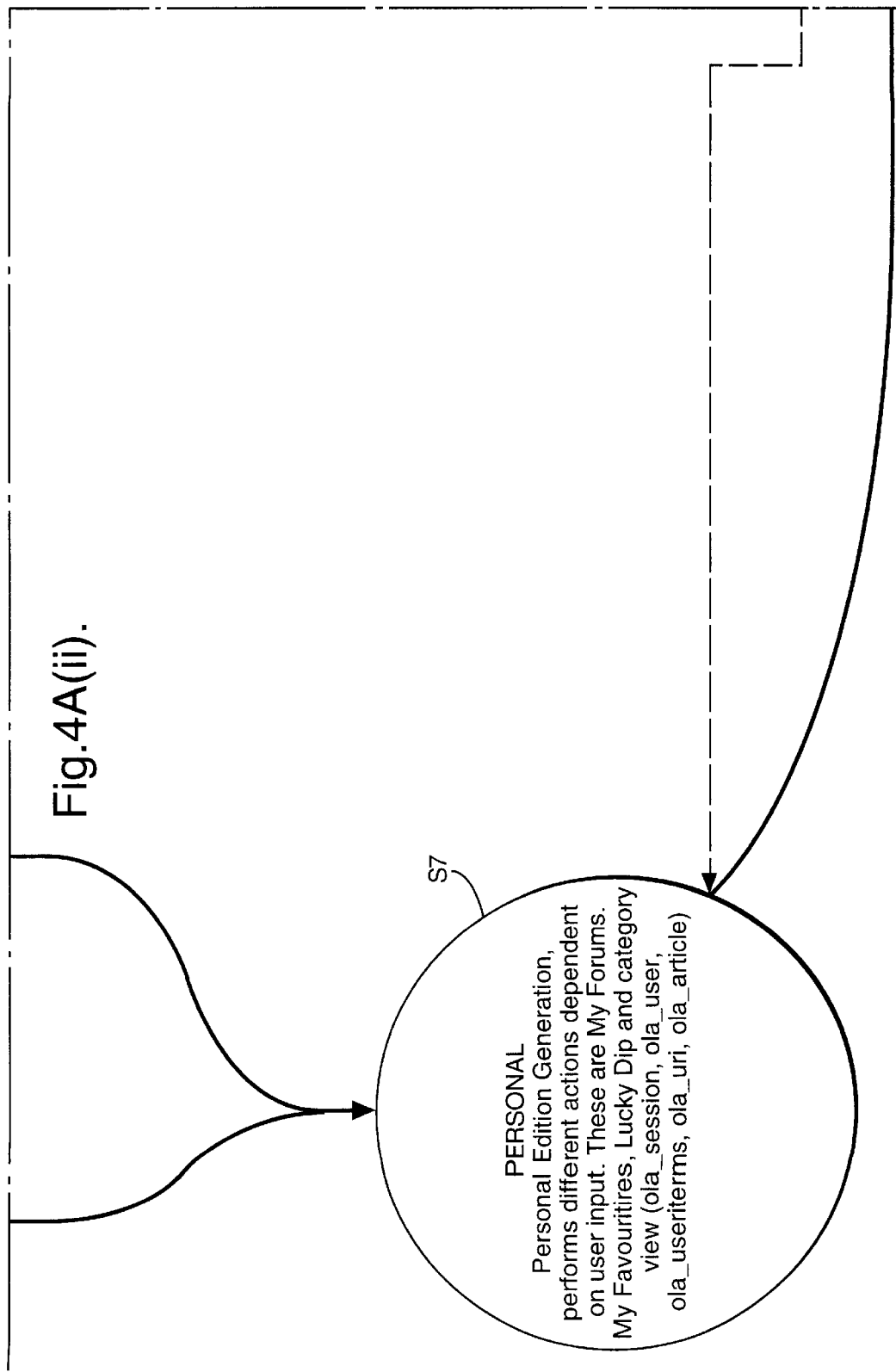

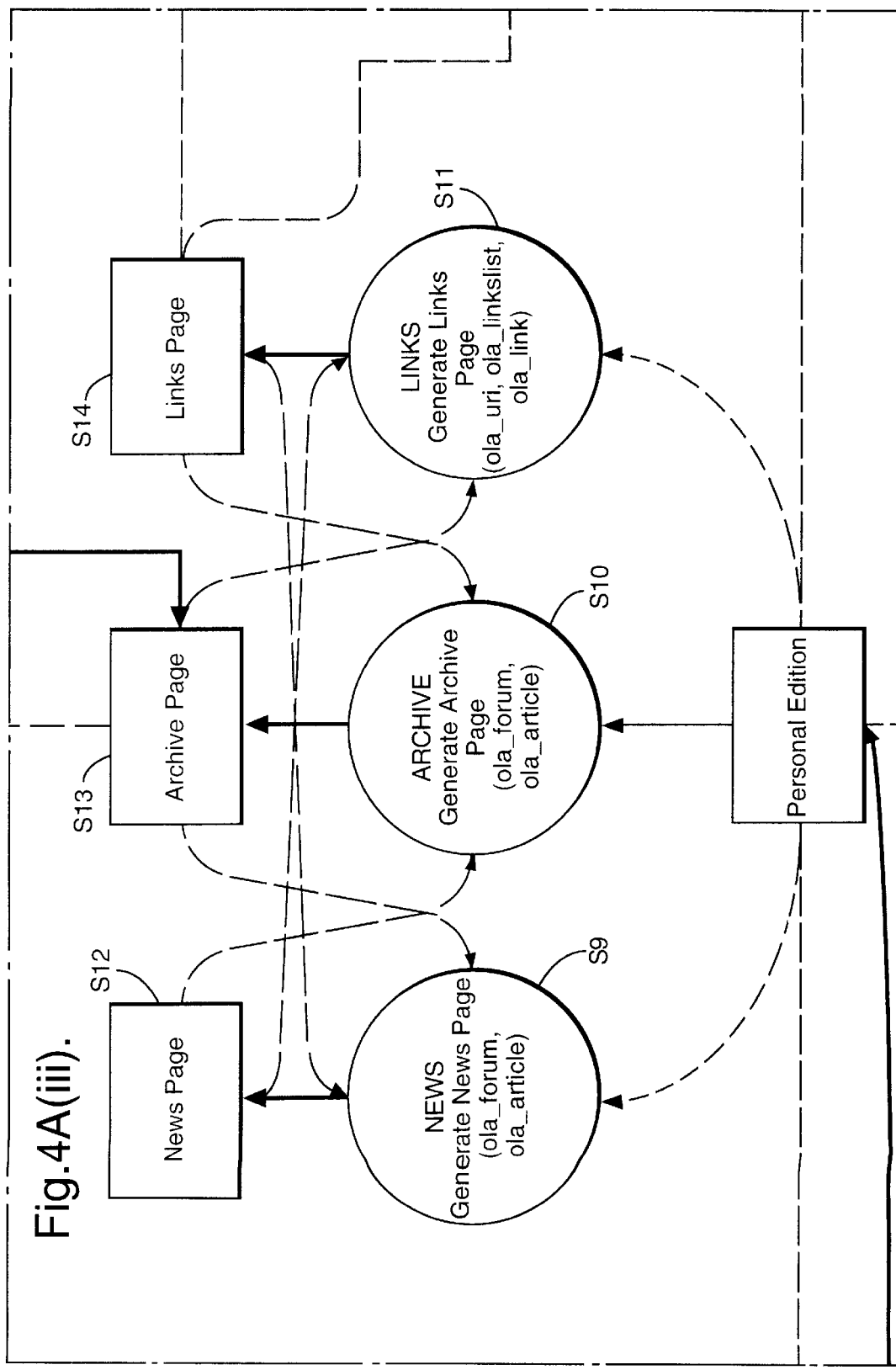
Fig.4A(iii).

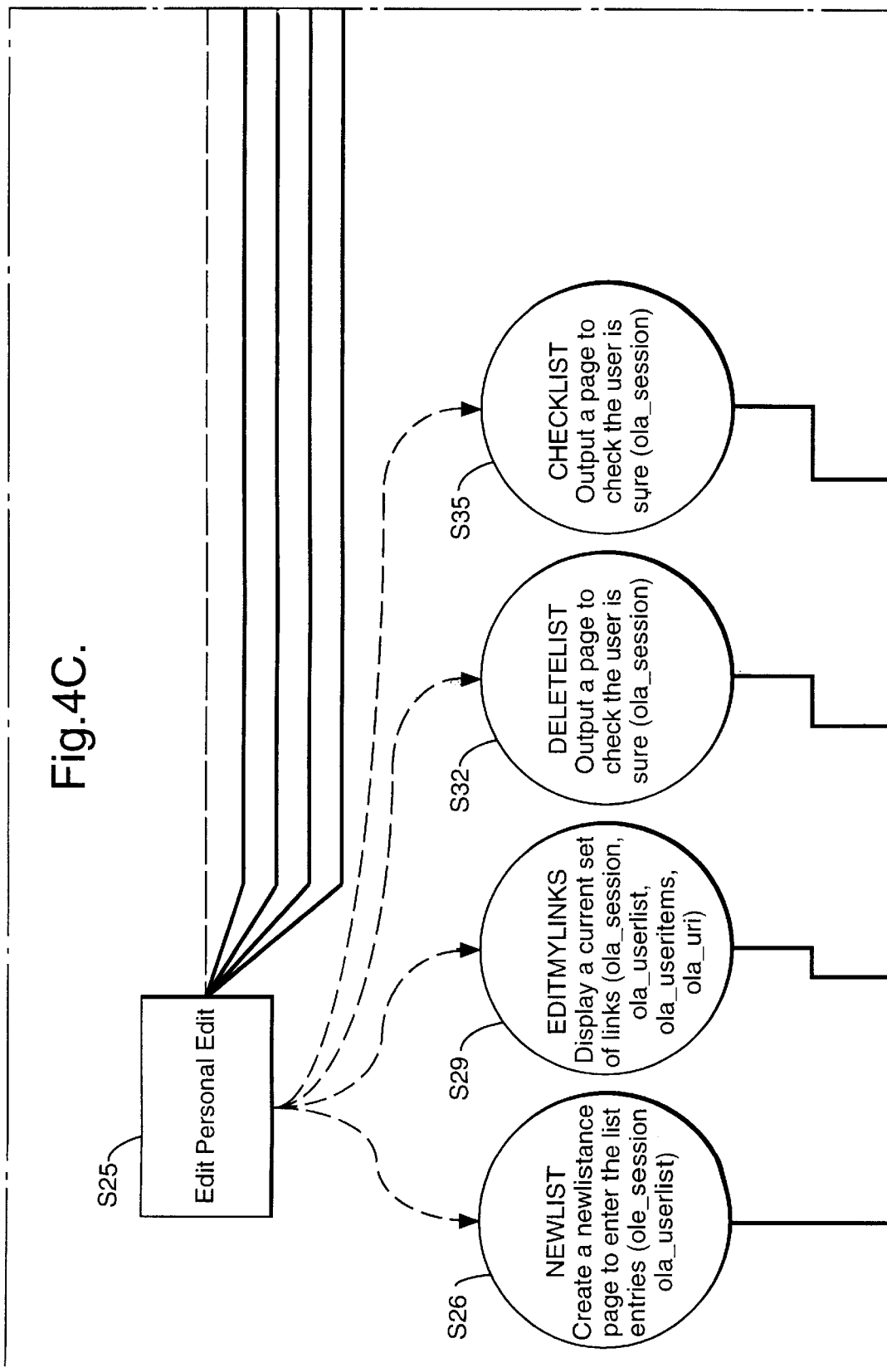

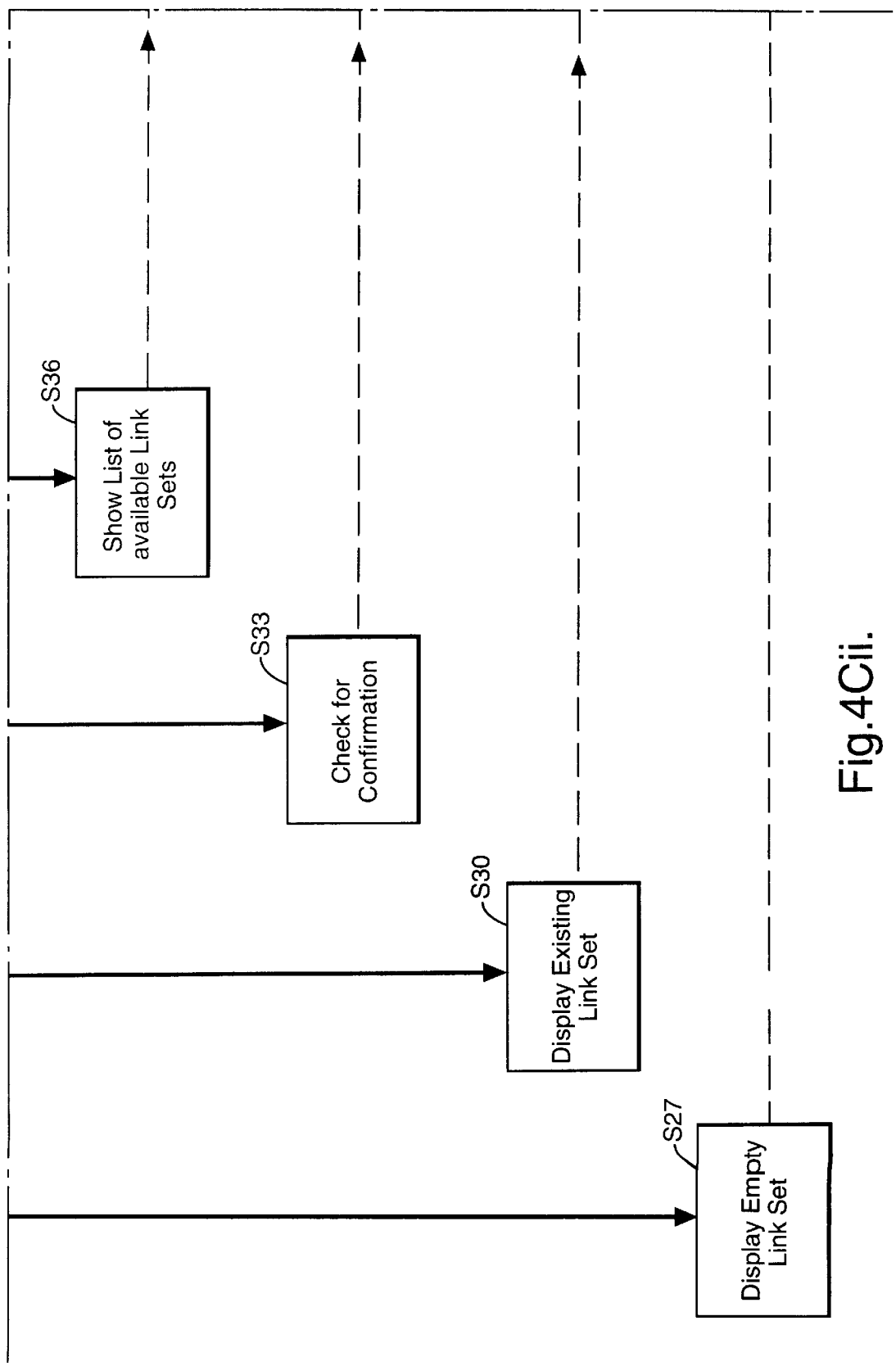

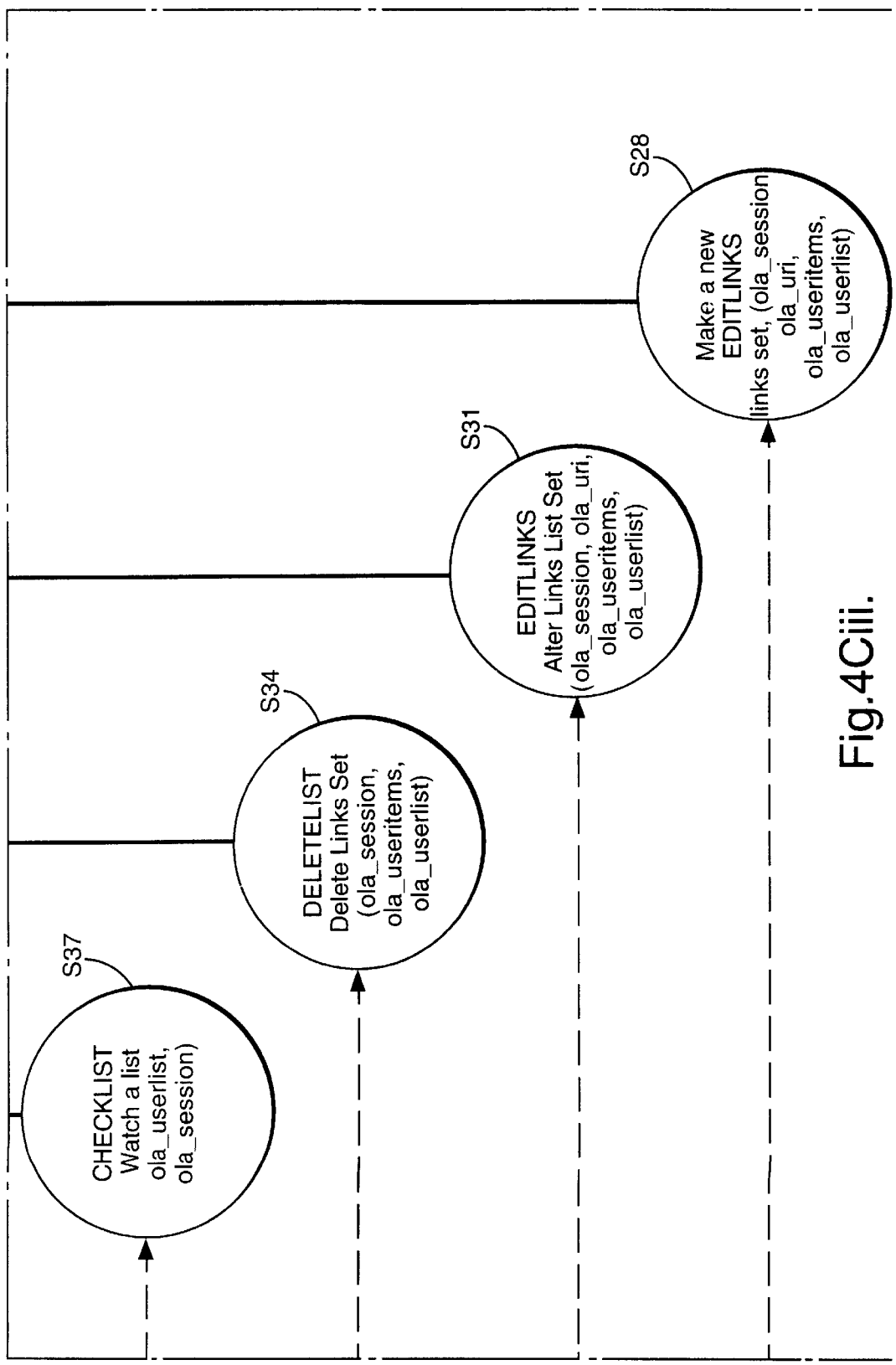

DATA COMMUNICATION SYSTEM

FIELD OF THE INVENTION

The present invention relates to a data communication system between client and server computers, particularly to system using the Internet or an intranet for data communications.

BACKGROUND OF THE INVENTION

The Internet is a dispersed collection of computers communicating with each other using a protocol called TCP/IP (Transmission Control Protocol/Internet Protocol). These computers fall into two categories: "host" computers, also referred to as servers, and "client" computers. Host computers form the backbone of the system and each is connected by a dedicated link to at least its nearest neighbouring host. Host computers are typically owned and operated by large governmental, academic and commercial organisations to provide services to their members and clients. Although the Internet grew out of academic and government networks an increasing proportion of the servers in it are operated by "Service Providers" who provide access to the general public for a fee.

Client computers form the interface between users and the hosts or servers. They are connected to the servers either directly, by a local area network (LAN) or by dial-up telephone line and modems. The latter is usual for members of the public who purchase access from service providers.

Host computers are identified by a four part IP address in the form AAA.BBB.CMDDD, where each component is a number less than 256, which are related to more user-comprehensible names by the Domain Name Server (DNS) system. For example, one host at Sony Europe is called "opus.ipek.de", which corresponds to the IP address 194.77.200.3. "opus" is the host name of that machine and "ipek.de" is the domain name of the IP address range 194.77.200.1 to 194.77.200.62. Each resource on the Internet, including Web pages (see below), has a unique address known as a Uniform Resource Locator (URL) which includes the hot name and domain name of the server hosting it. Specific users are identified as "userid" "hostname.domainname", for example "FredBloggswww-.sony.com".

When a host computer has a message or address for another host it sends it to a host to which it has a direct connection that is in the general direction of the ultimate destination of the message or request. That computer then forwards the message to another host again in the general direction of the ultimate destination and so on until the message is delivered.

The Internet provides a number of services to its users of which the most popular is the World Wide Web (WWW). The World Wide Web is essentially a collection of files, often referred to as Web pages, in a variety of formats stored on host computers, often called Web servers, in the Internet. A collection of Web pages published by an organisation is often termed a Web site and its first or highest level page the homepage. Most Web pages are textual documents described in Hypertext Mark-up Language (HTML). Such pages may include images, still or moving, and audio data. The key feature of HTML is the ability to define Hypertext Links within the document which provide access points to other parts of the same document, other Web pages or other Internet facilities.

To access the World Wide Web, the user employs software on his client computer known as a Web browser, commercially available examples are Netscape Navigator™ and Microsoft Internet Explorer™. The user enters the address of a Web page, or selects one from a list of previously stored addresses often referred to as Bookmarks. This address includes the address of the Web server holding that Web page. The Web browser then automatically contacts the user's service provider, dialling up a link over the telephone network if necessary, and issues a request for that Web page. This is forwarded to the relevant host computer which replies by sending back the relevant page, if it exists. The communication of the Web page is conducted using the Hypertext Transfer Protocol (HTTP) as a result of which World Wide Web Page addresses begin "HTTP://". Access to most Web pages is unrestricted however it is possible for this to be controlled by use of passwords.

As the Web page is received by the client computer the user's Web Browser software constructs and displays the page according to the instructions specified in HTML. This may allow a degree of control to the user's Web browser software or may precisely specify the locations of the components in the displayed image. Hypertext links comprise two components, a part to be displayed to the user, either text or an image such as an icon, and the associated address, which may be within the same Web page or may be a completely different page. Different addresses may also be associated with different parts of an image. The part of the link displayed to the user is generally distinguished from other parts of the page, for example in the case of text by being underlined or in a different colour. Generally the client computer will use a mouse (or trackball) and on-screen pointer for input of commands, in this case the pointer is often arranged to change shape or colour when located over a hypertext link. When the user selects a hypertext link, usually by positioning the pointer over it and clicking a mouse button, the Web Browser software automatically accesses the corresponding Web page.

The World Wide Web is extremely popular and continually growing but users often complain that it is slow to access the Web pages in which they are interested. Whilst a user may have a relatively fast link to his service provider, e.g. a 28.8 kbps modem, the connection from the service provider to the server containing the Web page being loaded may involve several different link hops shared with other traffic so that the effective speed of this is considerably less, especially at peak times.

Most users accumulate collections of Web pages that they visit often. Accessing these pages is assisted by the provision of bookmarks, which are links to the corresponding pages pre-stored in the user's Web browser. However many pages are updated at unpredictable intervals at the whim of the author. The user cannot tell whether or not a Web page has changed without visiting it, which can be a time consuming process.

In part because of the lack of a secure method of arranging payments over the Internet, most organisations providing Web pages and discussion forums do not charge users for access. Instead, some attempt to recuperate their costs by displaying advertising. Some service providers also attempt to keep their charges down or make additional profit by carrying advertising. Such advertising delays access to the Web pages or other services and can be particularly irritating to the user if he or she is paying for access time by the hour and also paying for the telephone connection.

To advertise their services, many Web sites include "What's New" listings in their homepage. Some service providers also provide such listings each time the user accesses the service. These can again be irritating to the user as they take time to transmit for which the user is paying.

As far as the providers of Web sites are concerned, to maintain a Web site generally requires a knowledge of HTML and often considerable input from the site administrator. Software to assist in this is available but does not completely dispense with the need for skilled input. This hinders the regular updating of Web pages by unskilled users.

Whilst the Internet is a global open network, its advantages and ease of use have been recognised as useful for smaller, closed networks. Networks using the Internet's protocols and software but confined to a single organisation are termed intranets. They suffer from the same problems as the Internet to varying degrees.

SUMMARY OF THE INVENTION

The present invention has been developed with the aim of alleviating or eliminating the above mentioned drawbacks of the prior art.

The present invention therefore provides: a server computer for a data communication system and adapted to transmit a document via a network to a client computer in response to a request therefrom; said server comprising:

article memory means for storing a plurality of article documents and respective bibliographic data;

selection rule storage means for receiving from a system administrator and storing an article document selection rule;

automatic document assembly means for retrieving from said article memory means a subset of said plurality of article documents and assembling a document from at least part of each of said subset of article documents, said subset of article documents being selected according to the respective bibliographic data using said article document selection rule; and transmission means responsive to said request for transmitting the assembled document onto said network for delivery to said client computer.

The server computer for a data communication system of the present invention can thus automatically create and update documents, such as web pages, to reflect the addition of new material without requiring intervention from a system administrator or skilled user each time material is added. At the same time such documents are prevented from becoming unwieldy as more and more material is added.

The present invention is embodied in a web server known as the ola™ server which is described below.

BRIEF DESCRIPTION OF THE DRAWINGS

The present invention will be further described hereinafter with reference to the following description of an exemplary embodiment and the accompanying drawings, in which.

In the various figures, like parts are indicated by reference numerals.

DESCRIPTION OF THE PREFERRED EMBODIMENT

Figure 1:
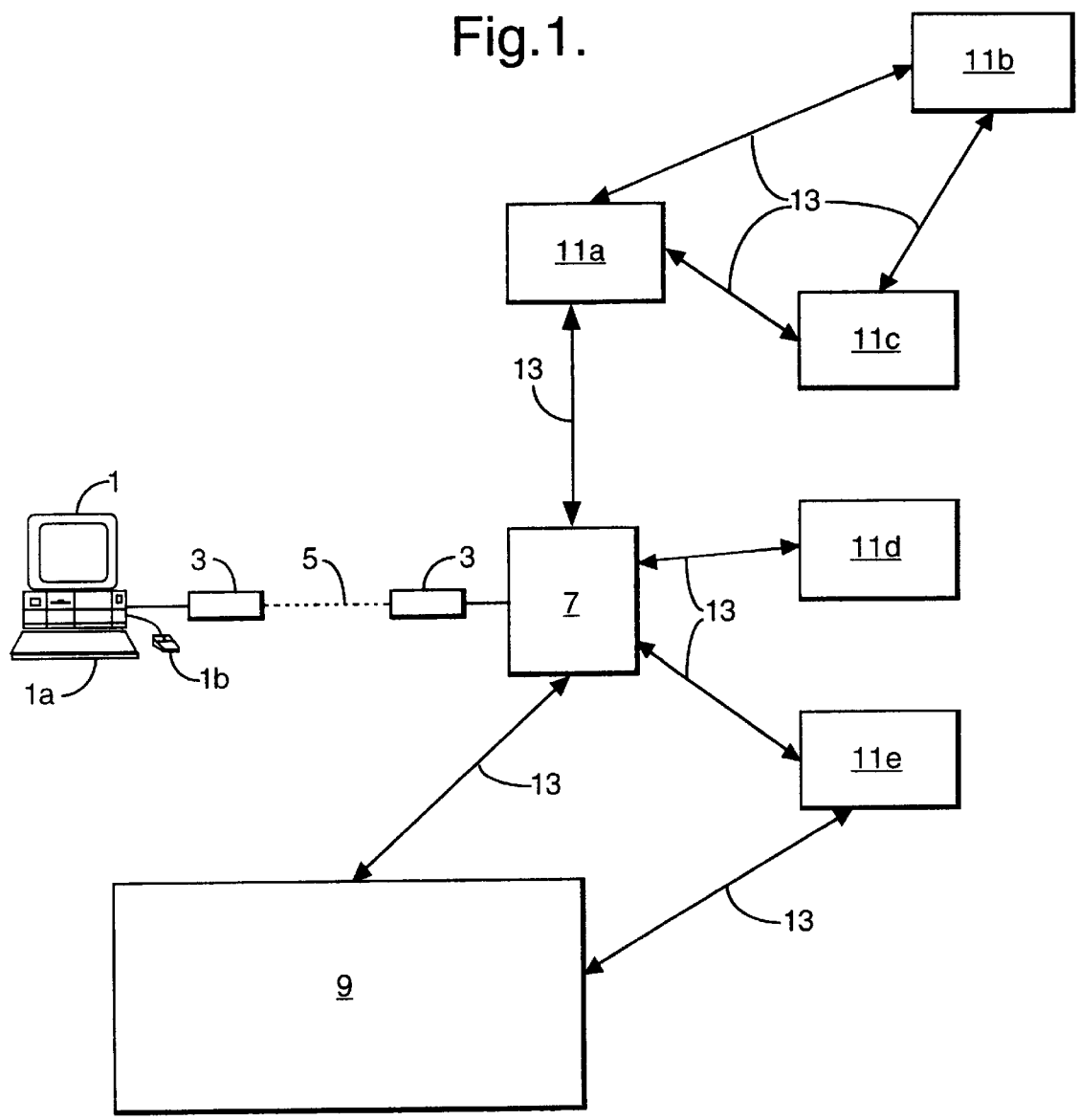
FIG. 1 is a schematic diagram of a part of the Internet embodying the present invention.

FIG. 1 is a schematic diagram of a part of the Internet embodying the present invention.

A user's personal computer (PC) 1 is connected, via modems 3 and a dial up telephone line 5, to the host computer/server 7 of an Internet service provider. The PC 1 may have a keyboard 1a and a mouse 1b for inputting data and commands. The service provider's server 7 is connected in turn to other host computers 9 and 11a to 11e via dedicated links 13. These other servers are X9 also interconnected by dedicated links. Server 9 is the ola™ server and is described in more detail below.

Figure 2:
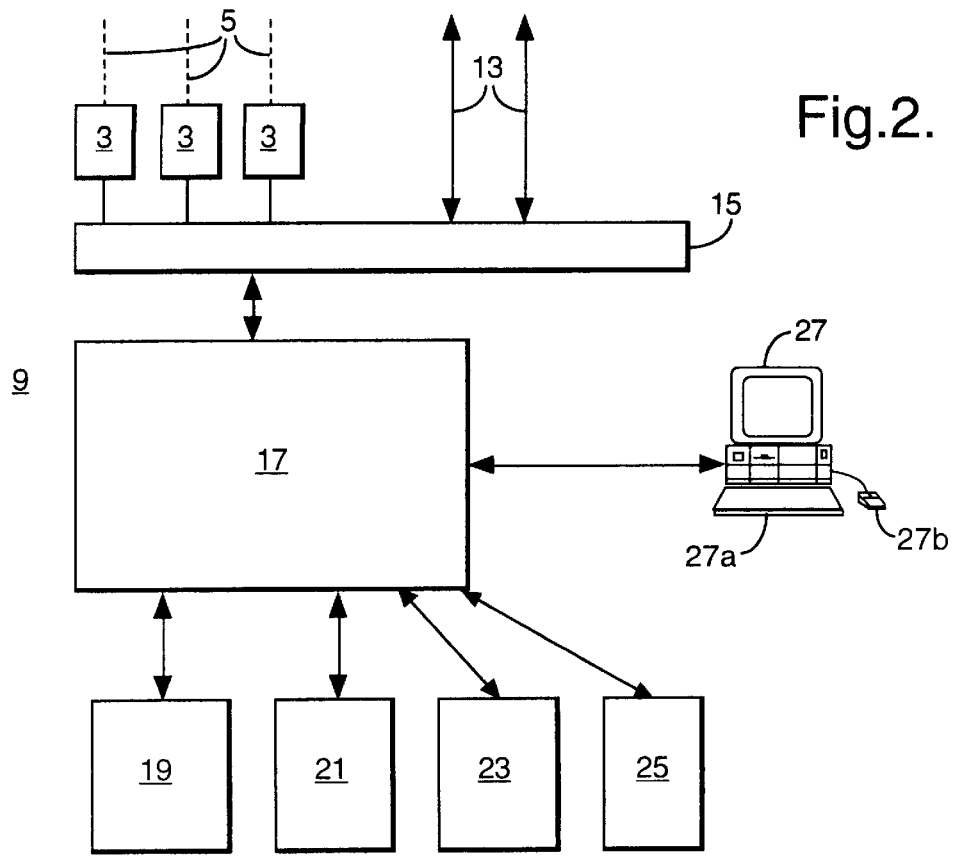
FIG. 2 is a schematic diagram of the ola(™) server embodying the present invention.

FIG. 2 is a schematic diagram of the ola™ server 9 the central processing unit (CPU) 17 of the ola™ server is connected to the dedicated Internet links 13 via an interface 15. This interface 15 may also connect to modems 3 allowing users direct access over dial up telephone lines 5. The ola™ CPU 17 may be any suitable computer such as a Sparcstation manufactured by Sun Microsystems and using the Solaris' operating system. The ola™ CPU 17 is also connected to Personal Edition memory 19, advertisement memory 21, forum memory 23, and component memory 25 which store different components of the ola™ service, as will be described below. These memories may be RAM's, fixed (or hard) disk drives, removable (or floppy) disk drives, optical disks, tape 20 streamers, etc. having the required capacity and access speed as well known in the art. Whilst the different memories 19, 21, 23 and 25 are here described as separate devices, it is of course possible for several of the memories to be contained in one physical device or for several physical devices to make up one memory. The memories may also be dynamically divided between main storage devices and cache memories as known in the art. In any event the allocation of data to storage devices is generally left to the server operating system.

The operation of the ola™ service will now be described.

The ola™ service provides for the user news and information on a variety of topics as well as discussion forums and facilities to assist in monitoring both ola™ and other Web sites in which the user is interested. The ola™ service is implemented by a suitably programmed Web server and "dynamic" HTML pages, that is pages that are constructed dynamically in response to user requests and information relating to registered users stored in the olaf™ server. Pages are constructed from components, e.g. images, icons, image maps and text passages, stored in the component memory 25. These components are assembled in standard Web page templates also stored in component memory 25.

The various databases may be maintained by a commercial available package such as Illustra™ and suitable Web server software such as that available from Netscape Communications Corp. Specially written software in C++, Perl and using SQ1, queries is used to perform the special ola™ functions and construct the dynamic Web pages.

Figure 3:
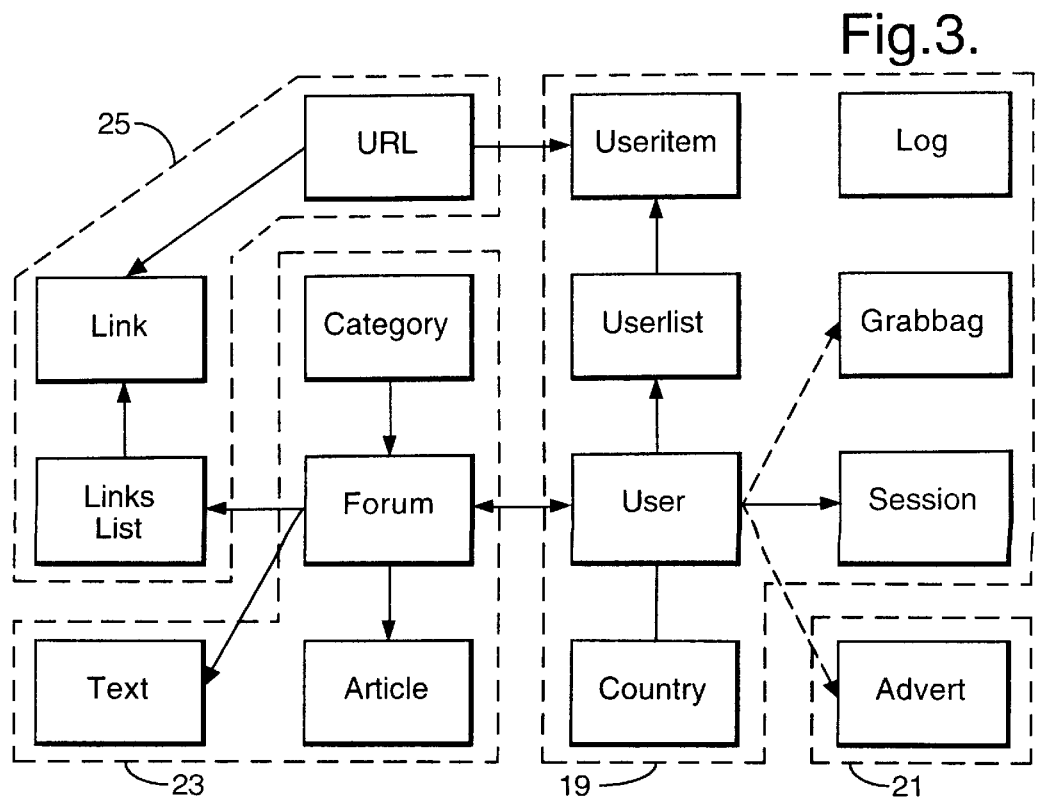
FIG. 3 is a schematic view showing the different tables maintained by the ola™ server.
Figure 4A:
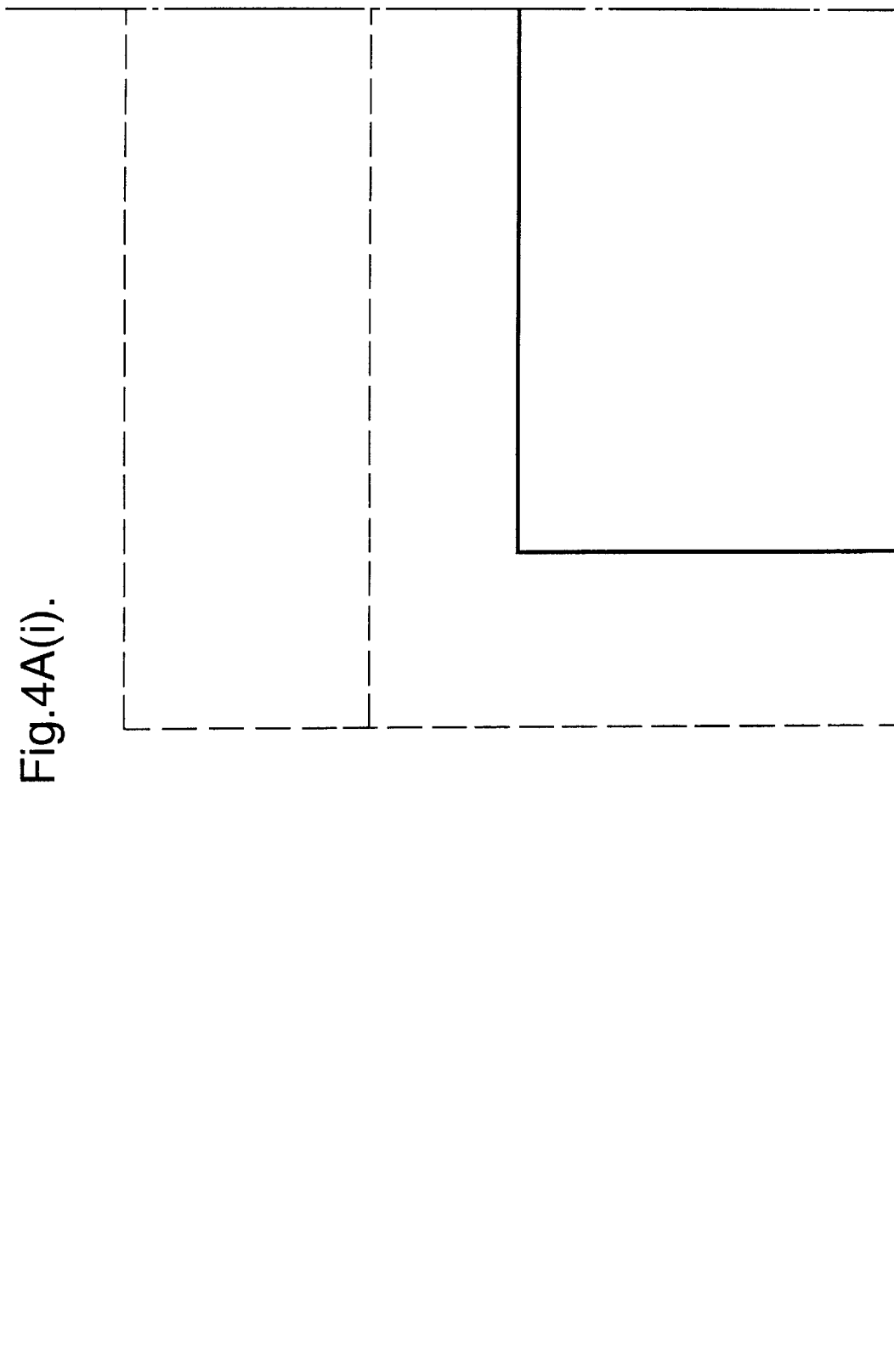
FIGS. 4A to D are a schematic view showing the overall process of the ola™ server.
Figure 4B:
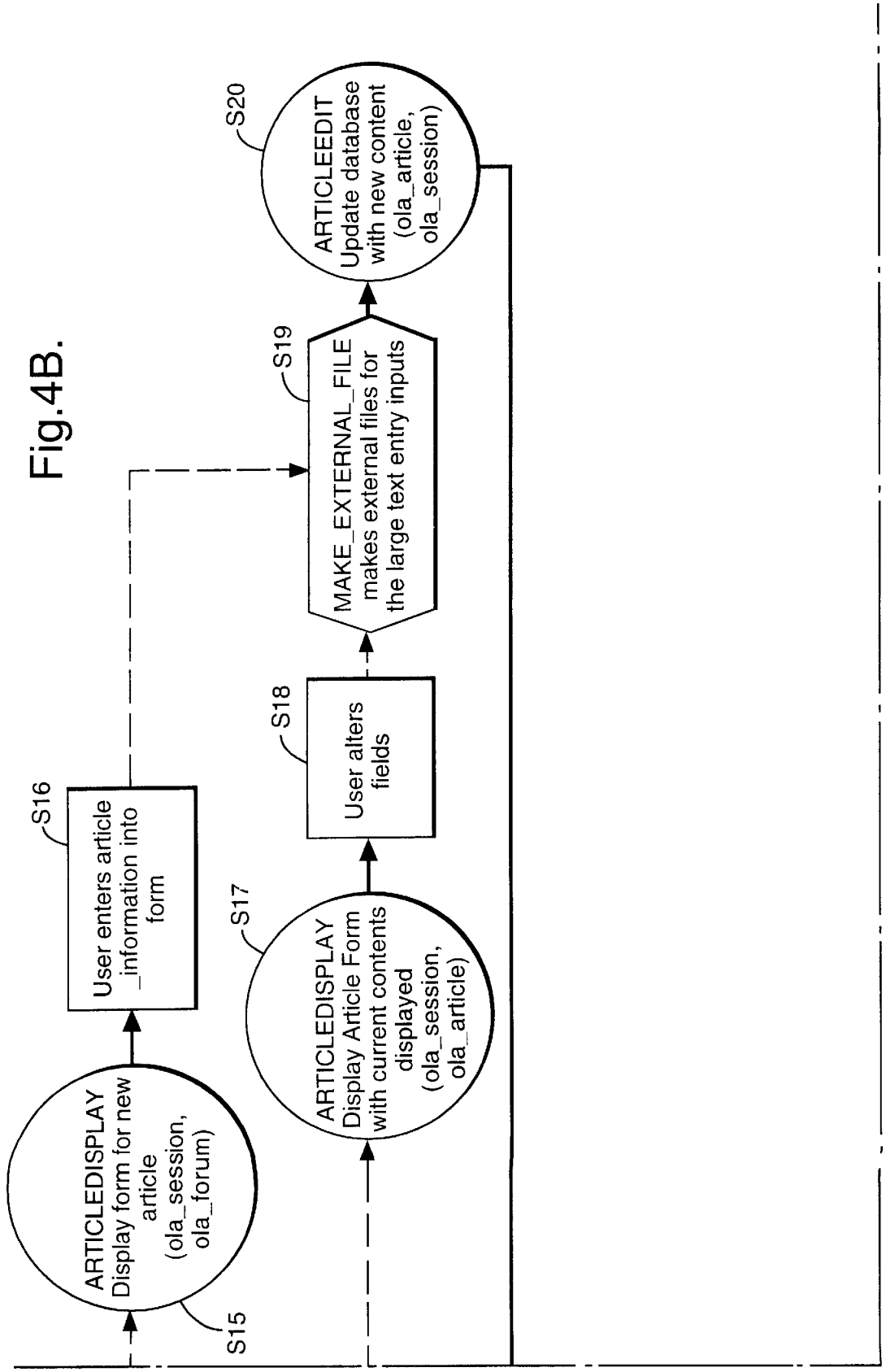
Figure 4B:
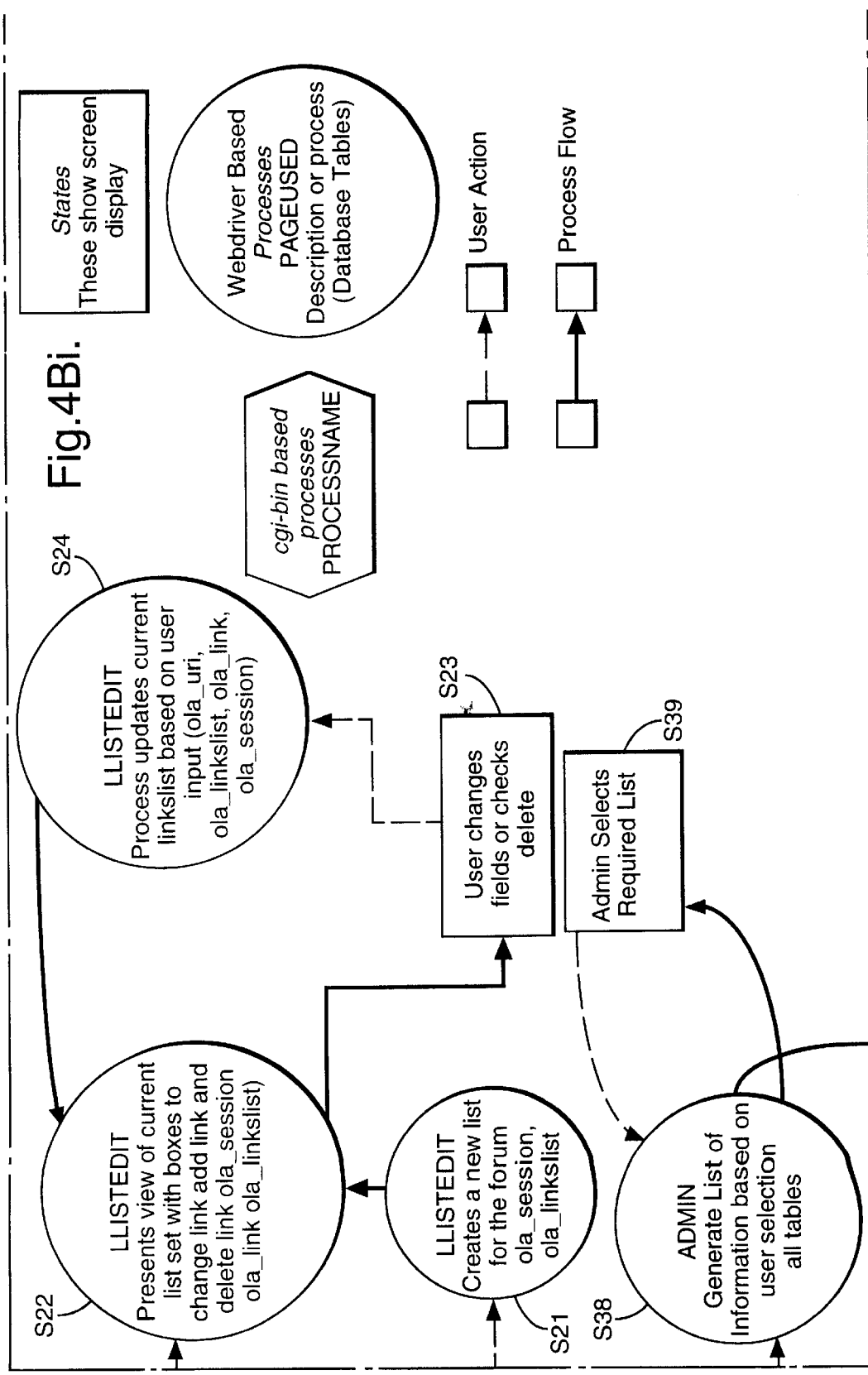
Figure 4C:
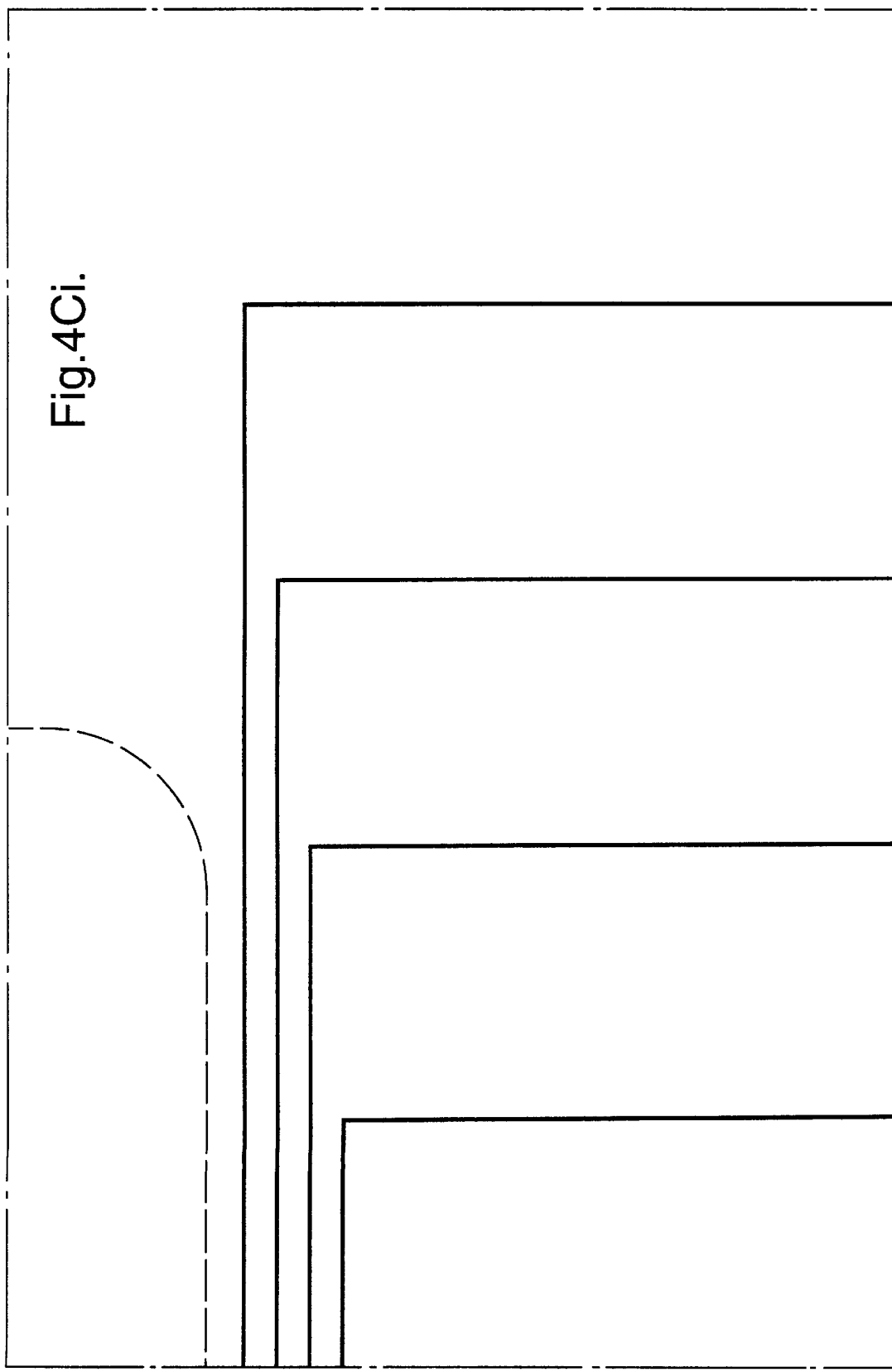
Figure 4D:
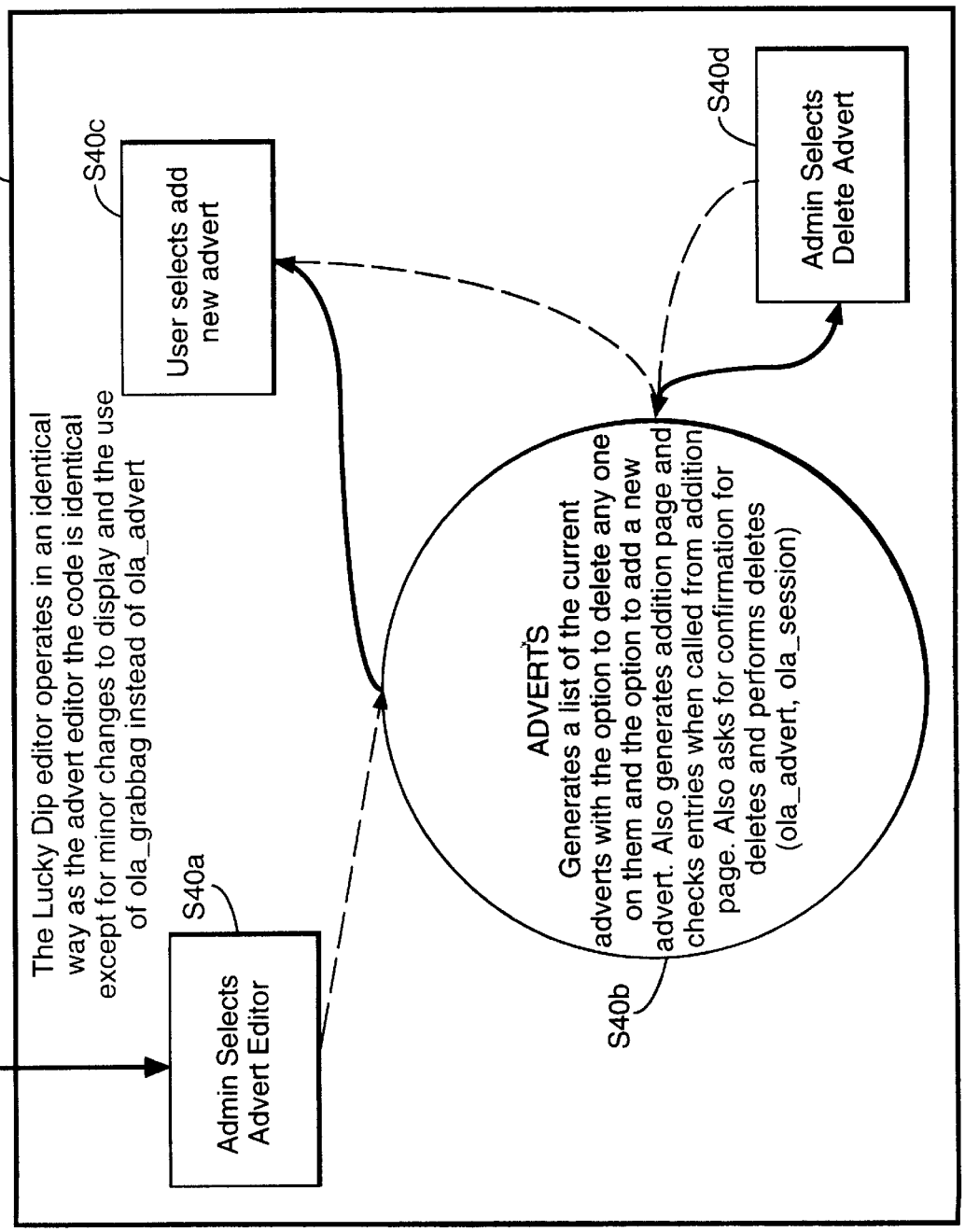

The various tables maintained by the ola™ server and their interrelationships are shown schematically in FIG. 3. This figure also shows how these tables relate to the Personal Edition memory 19, advertisement memory 21, forum memory 23, and component memory 25 described above. This table will be referred to below.

An overall schematic of the processes carried out by ola™ server is shown in FIGS. 4A to D. The steps shown therein will be referred to below by number, e.g. S13.

Figure 5:
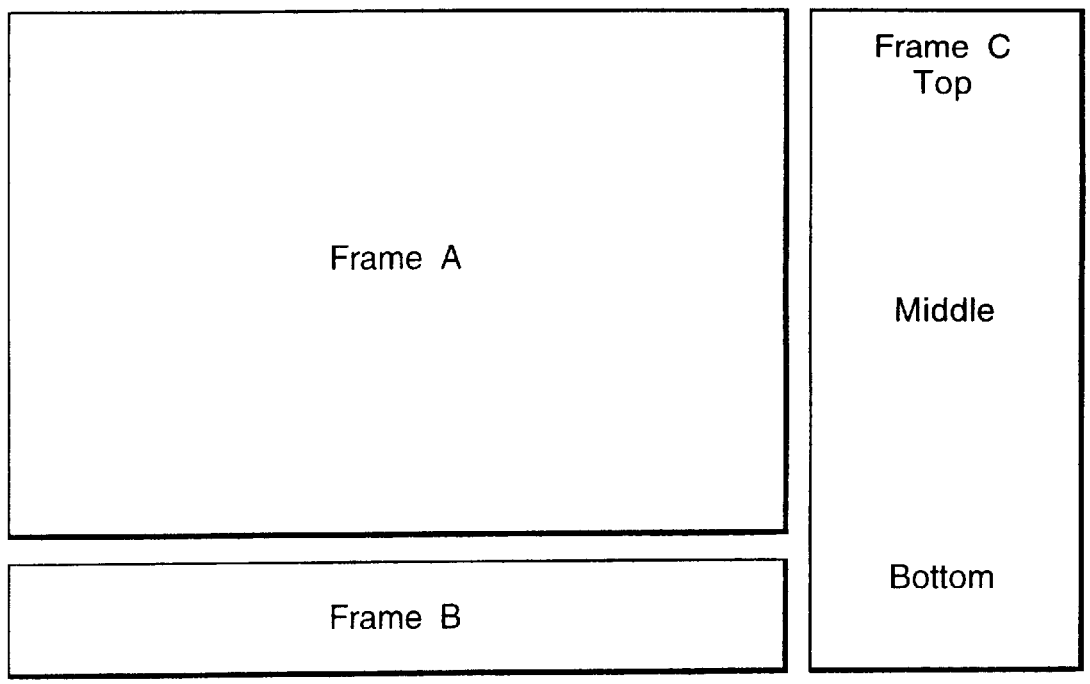
FIG. 5 is a view showing the standard ola™ screen layout.

Within ola™, screens are laid out in a standard format, as shown in FIG. 5. As can be seen, the major part of the screen is taken by Frame A which normally contains the Web page currently open. Below Frame A is Frame B which normally contains icons relating to ola™ functions and forums as described below. To the right of Frames A and B is Frame C which is used for the Personal Edition service described below. Frame C is notionally divided into three parts, top middle and bottom, though no divisions are apparent to the user. The screen layout as shown in FIG. 5 will be sized according to the available screen area in the user's Web browser, with scroll bars being provided where any part of the frame is too small for the content to be displayed.

Figure 6:
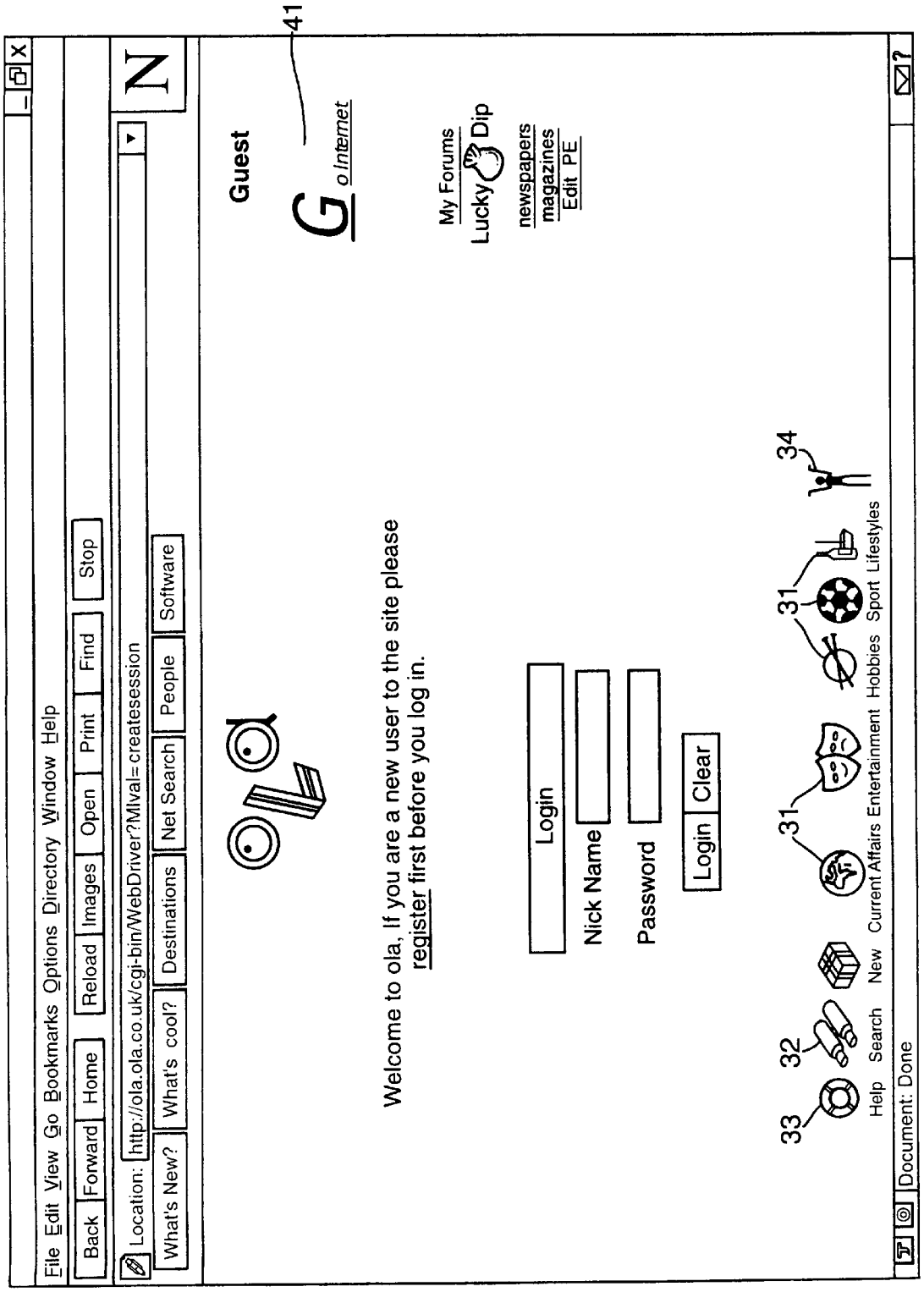
FIG. 6 is a view showing the ola™ homepage.

The icons displayed in Frame B are preferably part of a single image, known as an image map, shown in FIG. 6. With such an image, the user's Web browser reports the location of the user's pointer within the image when the mouse button is clicked. The client browser software then determines the appropriate link to access according to the reported location. It is also possible to use so called server-side image mapping. As mentioned, the image map may include links 31 to various of the ola™ forums or categories of forums. It may also include link 32 to a search tool allowing the user to search for text within the whole of the ola™ system and a link 33 to a help function.

In the present ola™ system, there are two versions of the image map, one much thinner than the other. The image map includes a region 34 for instructing a swap between them. When the user selects this region the ola™ server sends the other image map and instructs the user's Web browser to adjust the frame sizes accordingly. The thinner image map allows greater area to be devoted to Frame A. The top part of Frame C normally displays the ola™ logo and the user's nickname. If the user is browsing, not having registered, this part will give "guest" as the user's name.

The middle part of Frame C, just below the user's nickname, displays an advertisement 41 which may be a hypertext link to the advertiser's Web site or a page within ola™ giving further information. The same advertising logo may be displayed for all users or preferably, the ola™ server consults the user's Personal Edition, described below, and selects an advertisement for a product or service most likely to appeal or be useful to that user. For example, a listings magazine for the user's city if his/her favourite forum is nightlife or a local sports equipment supplier if his/her favourite forum relates to a sport, such as football. In this manner, the advertising is more relevant to the user and so less irritating. It is also more likely to be effective.

A default advertisement may be specified for users for whom there is no more relevant advertisement.

The ola™ server may also keep records on the Personal Edition database of which advertisements have been displayed to users so that repetition can be avoided, thus maintaining the user's interest.

In the presently preferred embodiment, the ola™ server maintains in the advertisement memory 21 a database of advertisements together with the categories of user to whom they are of possible interest, their date and an expiry date. Expired advertisements are automatically deleted from the database. To select the advert to display, a list is assembled of the adverts. Possibly relevant to the user. This list is then sorted according to date (oldest first) and number of times it has been displayed (least first). An advertisement is selected randomly from this list with the adverts being given increasing weight towards the top of the list.

The process for maintenance of the advertisement database is shown in FIG. 4, step S40 which comprises sub-steps S40a to Below the advertisement, in the bottom part of Frame C, a context sensitive menu is displayed. This contains as standard a number of links related to the user's Personal Edition and is sometimes referred to as the Personal Edition menu. In different circumstances, other options are added as described below.

When a user accesses the ola™ server, a new session entry is created S1 in the session table and the ola™ homepage is transmitted S2 to the user. An example of the current homepage, displayed by Netscape Navigator', is shown in FIG. 6. The user is asked to register S5 or, if already registered, to log in S6 by providing their nickname and password. It is also possible for users to visit the site as a guest, without first registering, though in this case not all facilities of the service are available.

Personal Edition

If the user decides to register, he/she selects the hypertext link shown by the underlined word "register" in FIG. 6 and his/her Web browser accesses S3 the ola(™) Personal Edition registration page. In the registration page the user is asked to provide S4 various personal details. These may vary but could include, for example, a nickname, a password, gender, year of birth, approximate address, e.g. by area or zipcode. The ola(™) service does not require the user's real name or precise address and other details, which some users may be reluctant to give to preserve their privacy. Some fields may also be optional, not requiring input from the user, though as a minimum the user must give a nickname and password. The nickname must not be the same as any other already registered and a minimum length, e.g. six characters, may be specified for the password.

The user is also asked to select one to three of the ola(™) forums in which he/she is most interested, with one specified as of most interest. In the present embodiment, the first, preferred, forum is obligatory; the others optional. The ola(™) forums are described below and may relate to topics such as nightlife, art, humour, current affairs, etc.

Finally, the user is invited to create sets of favourite links or URLs by specifying their addresses and optionally giving each a personalised name. These links can be Web pages, ftp locations, etc. and are grouped in link sets which are named by the user. The number of URLs in each link set may be limited, e.g. to six, and the number of link sets each user is allowed may also be limited. In the present embodiment the user may specify one link set to be included in Automatic Update Tracking, a service described below. This link set is referred to as the monitored link set. In other embodiments individual links or multiple link sets may be specified for tracking.

The data thus collected is stored S5 in the Personal Edition memory 19 and is used in ola(™) services as described below.

When the user next enters ola(™) by giving his/her nickname and password, he/she will automatically be directed to the home page of his/her designated favourite forum, e.g. nightlife, which is displayed in Frame A. An appropriate dynamic web page is constructed on the basis of the user's Personal Edition profile in S7.

Figure 7:
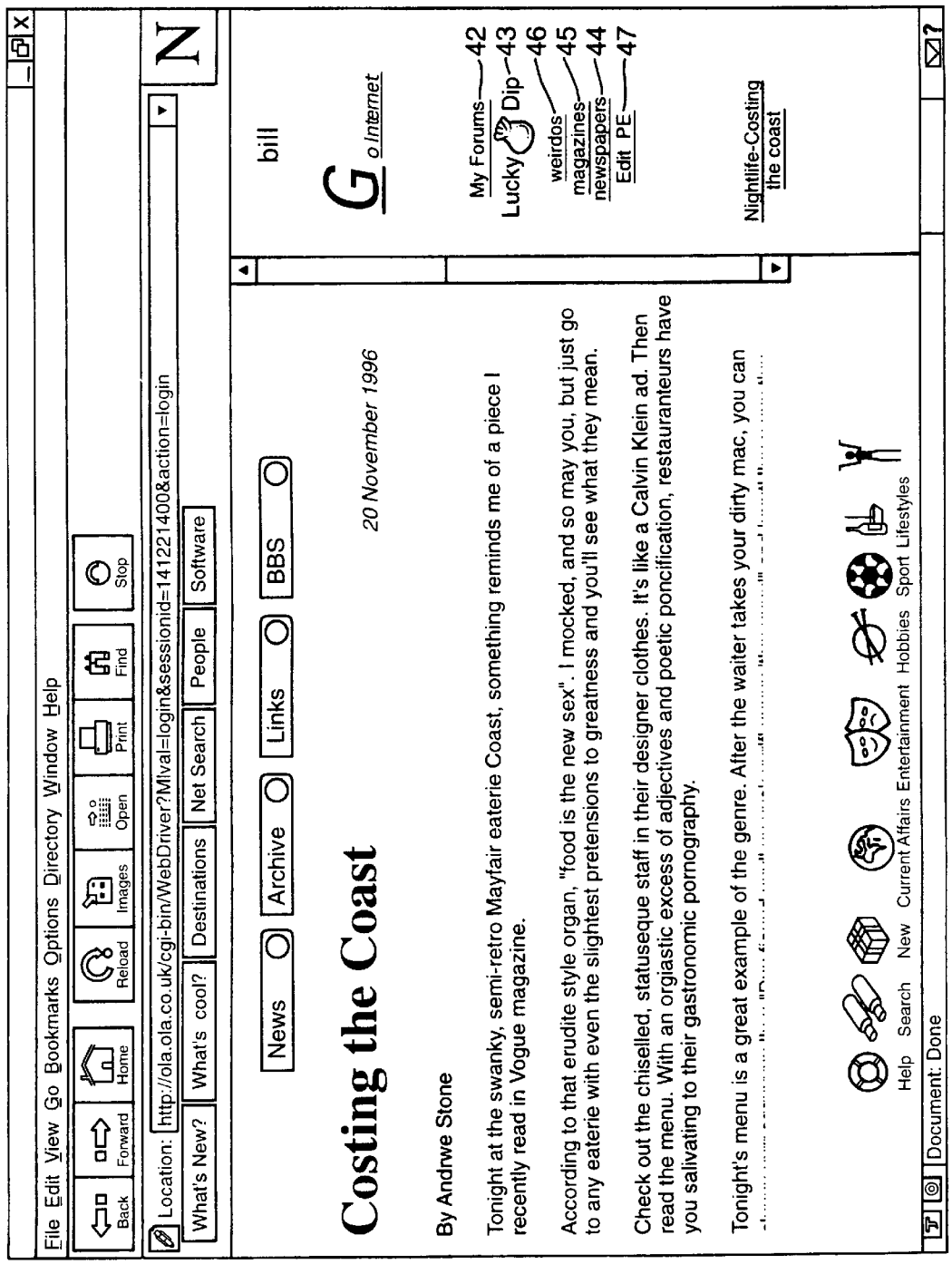
FIG. 7 is a view showing an example homepage for an ola(™) forum.

As shown in FIG. 7, when the user enters ola(™), the standard entries in the Personal Edition menu are "My Forums" 42; "Lucky Dip" 43; the titles of the user's link sets, in the present example "newspapers" 44, "weirdos" 45 and "magazines" 46; and "Edit PE" 47.

Figure 8:
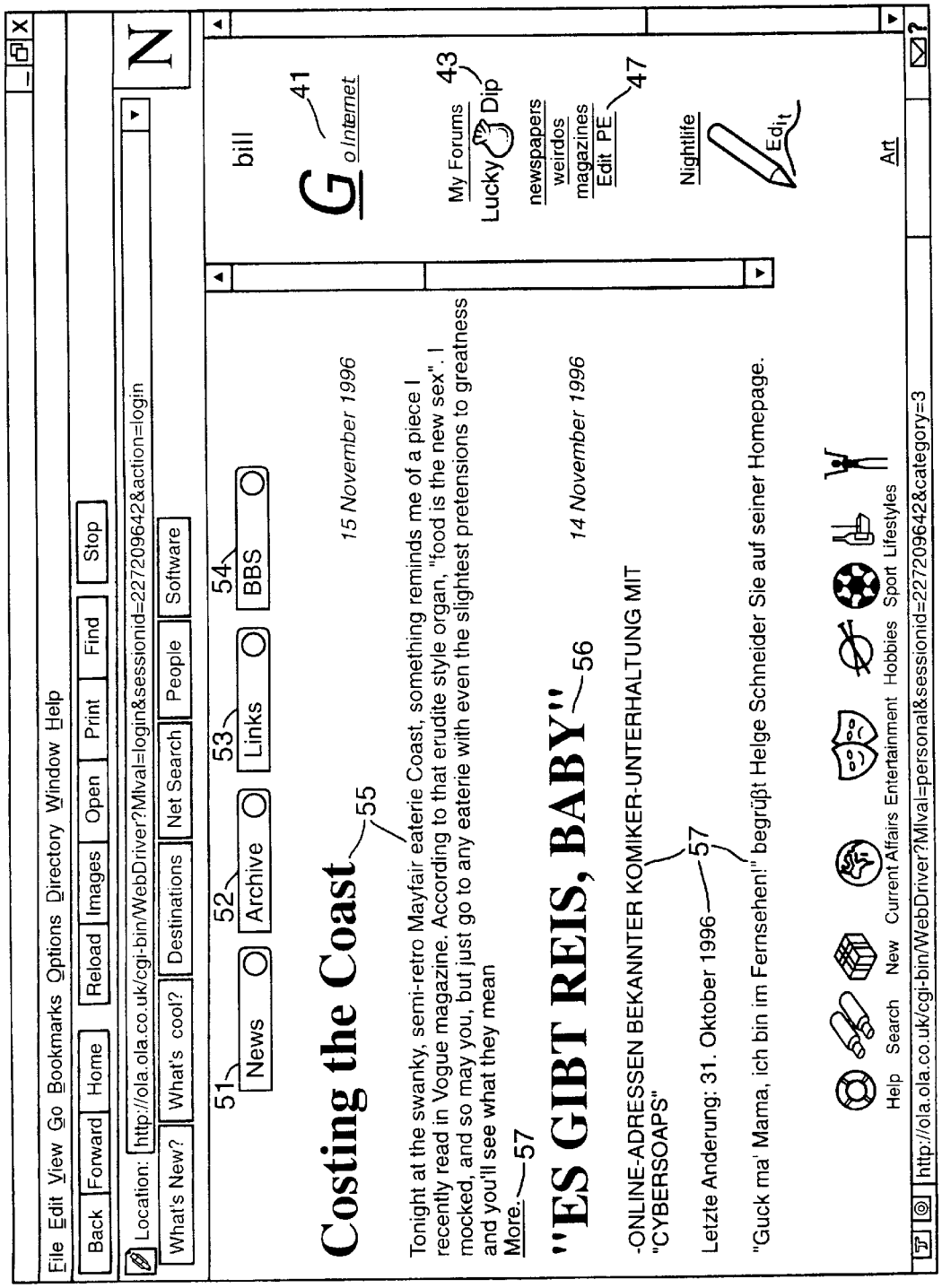
FIG. 8 is a view showing a screen listing the user's preferred forums.

If the user selects "My Forums", links to the content items within the forums listed in the user's Personal Edition profile are added to the bottom of the Personal Edition menu as shown in FIG. 8. These links represent content items that have been added to the forums since the user's last visit to ola(™). Selecting one of these links takes the user to that content item in the relevant forum.

Selecting the "Lucky Dip" icon 43 again adds links to the bottom of the Personal Edition menu. These links however are to Internet addresses specified by ola(™) administrators. These addresses may be within ola(™) or anywhere else on the Internet and are specified dynamically for each user on the basis of the preferences and other interests specified in the user's Personal Edition profile.

Figure 9:
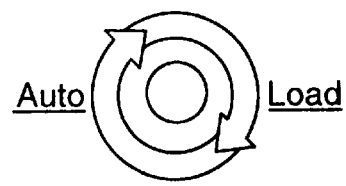
FIG. 9 is a view showing the Autoload icon.

If the user selects one of the links to one of his/her link sets then the links of that set are added to the bottom of the menu together with an Autoload icon, as shown in FIG. 9. The Autoload function will be described below. Selecting one of the links directs the user's Web browser to load the corresponding Web page into Frame A. When a user selects a link from a monitored set this is logged by the ola(™) server. When the user chooses the monitored link set, those URLs that have been updated since the user's last visit to ola(™) are flagged or highlighted. Which Web pages have been updated is determined by the Automatic Update Tracking function described below.

The "Edit PE" entry 47 in the Personal Edition menu takes the user to a menu of additional options. The user can select a form setting out the user's Personal Edition and allowing it, or at least those parts of it that are subject to change, to be edited. The user may also create, change or delete links and link sets. These options are illustrated in steps S25 to S35 in FIG. 4.

The ola(™) system administrator may also access the Personal edition profiles of all users (steps S38-S39 of FIG. 4), for example to extract statistical information.

Automatic Update Trackinq

The automatic update tracking feature of ola(™) operates without requiring user input. During slack periods, e.g. overnight, the ola(™) server runs a Web crawler program which accesses in turn the URLs within each user's monitored link set. The Web crawler compares the "last updated" field of each page header to the last logged visit of the user to that page. If the last updated field is later than the last logged visit then an indicator, e.g. a flag, appears in the Personal Edition menu when the links are displayed.

The system administrator may determine the frequency and order in which users' monitored links are checked. Each link should be checked at regular intervals, preferably daily. The frequency of checking user's link sets may also be determined according to the frequency of access to ola'11, either by the specific user or by all users. To avoid repeatedly checking the same site for different users, the ola(™) server constructs a table of all sites to be checked before accessing them.

In a modification of this feature, the automatic update function downloads each page that has been updated and stores it in the ola(™) server so that it can be displayed to the user more rapidly.

Because the automatic update tracking system operates by considering the last updated field, it is recognised that it may not function correctly with all Web sites. This is because some Web server software and site administrators disable the last updated field on their pages. Also, dynamically created pages, such as those generated by the ola(™) server, have a last updated field that reflects their creation in response to a request even if the actual content has not changed.

Autoload Function

Figure 10:
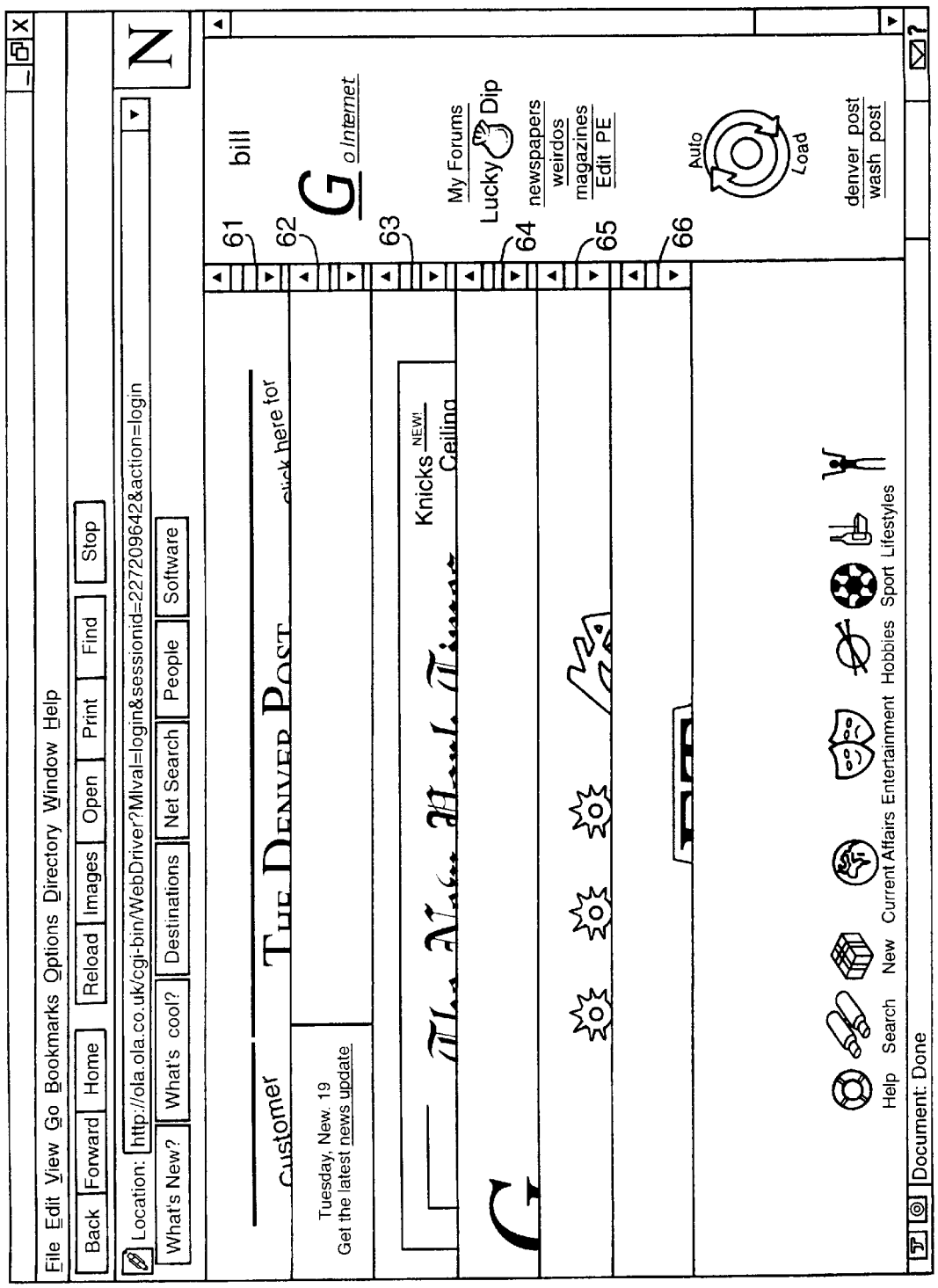
FIG. 10 is a view showing a screen in which several Web pages have been loaded using the Autoload function.

The Autoload function is designed to work with any predefined group of links such as links related to an article or content article or a user's link sets. In the ola(™) system, when a user's link set is displayed to a user, an Autoload icon is also displayed, as shown in FIG. 9. When the user selects this icon, the ola(™) server generates an HTML page for the displayed set of links and transmits it to the user's PC for display in Frame A. The effect of this is to subdivide Frame A into a number of subframes 61 to 66 corresponding to the number of links in the set. The user's Web browser is then directed to fill each sub-frame with the Web page indicated by the address corresponding to that link. The result is shown in FIG. 10.

An example of the HTML code to effect this is given below:

```
<HTML>
<HEAD><TITLE>CACHE</TITLE></HEAD>
<FRAMESET ROWS="10%,18%,18%,18%,18%,18%">
<FRAME NAME="-INFO " SRC=""/waitmessage.html">
<FRAME NAME="-0-" SRC="'http://www.washingtonpost.com">
<FRAME NAME="-1- SRC="http://www.ft.com">
<FRAME NAME=" 2 SRC="http://www.manslife.com">
<FRAME NAME=%' 3 SRC="http://www.telegraph.co.uk/et">
<FRAME NAME=%'-4- SRC="http://www.stern.de">
</FRAMESET>
</HTML>
```

Note that the above URLs are examples only and may not be correct addresses of publicly available web pages. The precise addresses used forms no part of the invention.

The code automatically generated by the ola(™) server will automatically be varied depending on the number of links and the link addresses are automatically retrieved from the appropriate records of the Personal Edition database stored in personal edition memory 19 or other ola(™) database.

In response to the Autoload code, the user's Web browser, divides Frame A as specified and issues concurrent requests to each of the servers indicated by the link addresses. These are then sent by the user's service provider toward the relevant hosts and the replies forwarded to the user. Because the different requests and replies will be transmitted by different routes, the response to one request will not be delayed by any of the others. The responses will be transmitted to the user's PC as they are received by the service provider's host. If responses arrive faster than can be transmitted to the user's PC they will automatically be buffered at the service provider's host. Thus most efficient use is made of the link between user and service provider. In practice, because the links to the other hosts and speed of response of those other hosts are so much slower than the link between service provider and user, several, often as many as six, Web pages can be received by the user in the time it would otherwise take to load one.

Because the necessary HTML code to achieve this is automatically created by the ola™ server, the user does not need knowledge of that language to benefit from this feature.

The Autoload function within a link set additionally includes an advertising page selected as described above and generates an additional sub-frame for this in the middle of Frame A.

ola™ Forums

The ola™ service includes a number of forums on a variety of topics which are grouped within various categories, such as entertainment, current affairs, sport, etc. An example forum, within the category entertainment, is nightlife. Each forum consists of a collection of articles on the relevant topics, links to related Web sites or material, and a bulletin board service (BBS) which may allow on-line chat and discussion services. Each forum is accessed by its respective homepage, also referred to as the news page. An example home page for the nightlife forum as displayed by Netscape Navigator™ is shown in FIG. 8.

In FIG. 8, the nightlife homepage is displayed in Frame A. At the top are four standard icons which are included in each page of the forum. These are "News" 51, "Archive" 52 "Links" 53 and "BBS" 54. One icon is always highlighted to indicate the user's current location. The News icon 51 takes the user directly to the home page. The Archive icon 52 takes the user to the archive which is a table giving descriptions of and links to all the articles that have been posted to that forum and is automatically maintained by an automatic content posting system described below. The links icon 53 takes the user to a page of links to other pages relevant to the topic of the forum. These links may refer to pages elsewhere in ola™ or on other servers on the World Wide Web. The forum editor and journalists set up the links and may group them in sets, see steps S21 to S24 of FIG. 4. An Autoload icon may be provided for each set, functioning as described above. Navigation between pages of a forum is illustrated in steps S9 to S14 of FIG. 4.

The BBS icon 54 takes the user to a relevant news/chat service also maintained in the ola™ service. This is similar to conventional services of this type.

The homepage for each forum includes headlines or teasers 55, 56 for a number of articles on the relevant topic together with links 57 to pages containing the complete text of the articles. The headlines are generally less than 200 words and may also include images. The number of headlines included on the homepage is set by the forum administrator. Articles are generated by "Content Generators" or journalists who post material to the forums using the automatic content posting system described below. All articles of each forum are stored in an article database in forum memory 23, this includes the article's text and any image references as well as data such as the name of the author or content generator and the date the article was posted to ola™. Articles may be accessed through the archive page which is reached from the archive icon 52 which appears at the top of each page in the forum. The archive page includes a table listing all articles by their headline and giving the author, date and a hypertext link to the full text. The articles in the archive are sorted by date with the newest first and new articles may be flagged.

Automatic Content Posting

Figure 11:
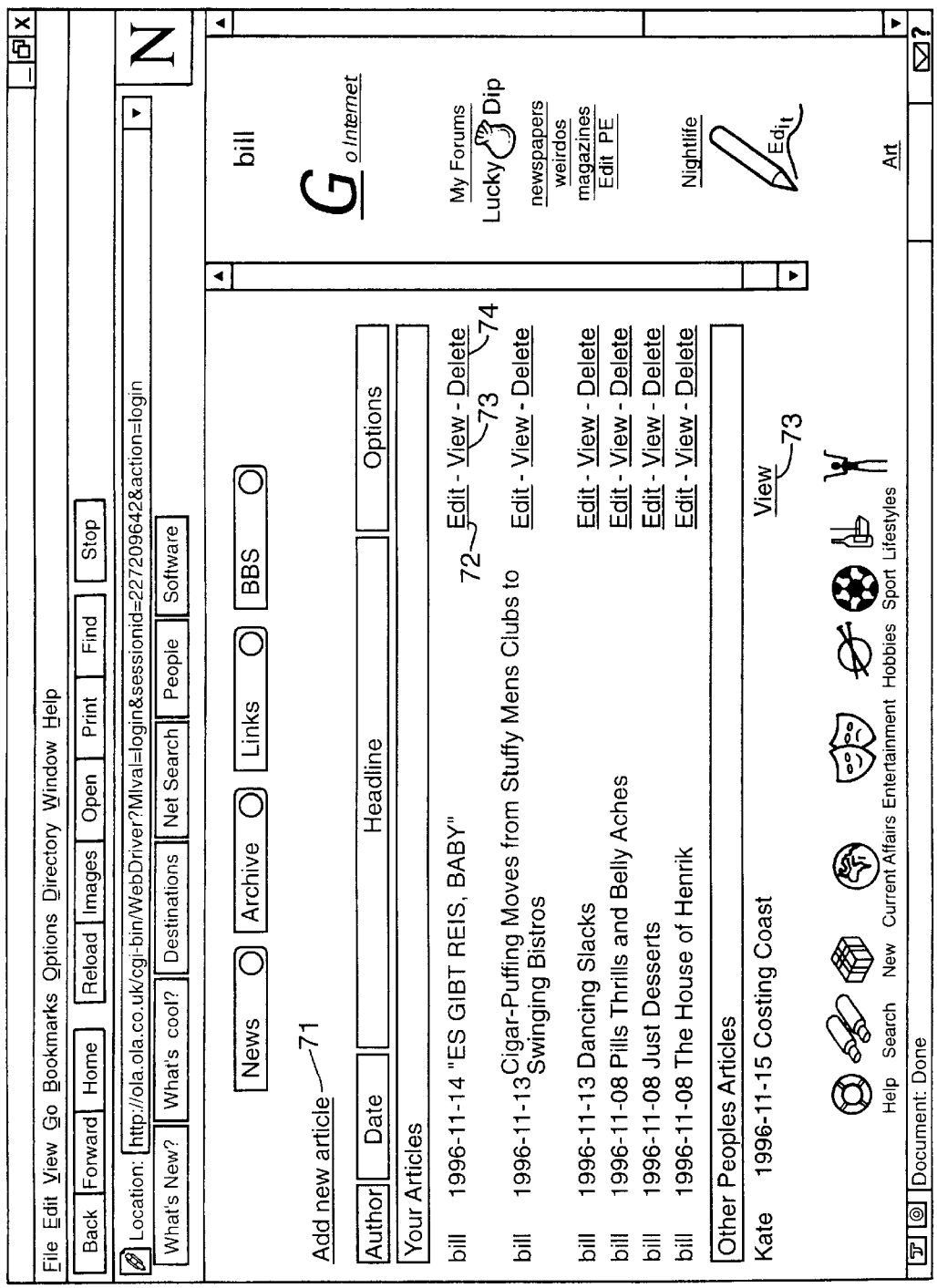
FIG. 11 is a view showing an archive screen for a content generator allowing editing and addition of material.

A user registered as a "Content Generator" for a forum may add and edit material through the archive page. When a content generator accesses the archive page the display format is slightly different, as shown in FIG. 11. For the content generator, the articles are sorted into "Your Articles" and "Other People's Articles" and an additional link "Add new article" 71 is shown. For the content generator's own articles options "Edit" 72, "View" 73 and "Delete" 74 are provided via hypertext links; for other people's articles only "View" 73 is shown as content generators may not edit or delete other people's articles. System administrators and Forum administrators/editors may add, change, or delete any content within a forum. The archive table is assembled from the database each time the archive page is accessed, thus ensuring it is always up to date. The process for editing or adding a forum Article is shown in steps S15 to S20 of FIG. 4.

Figure 12:
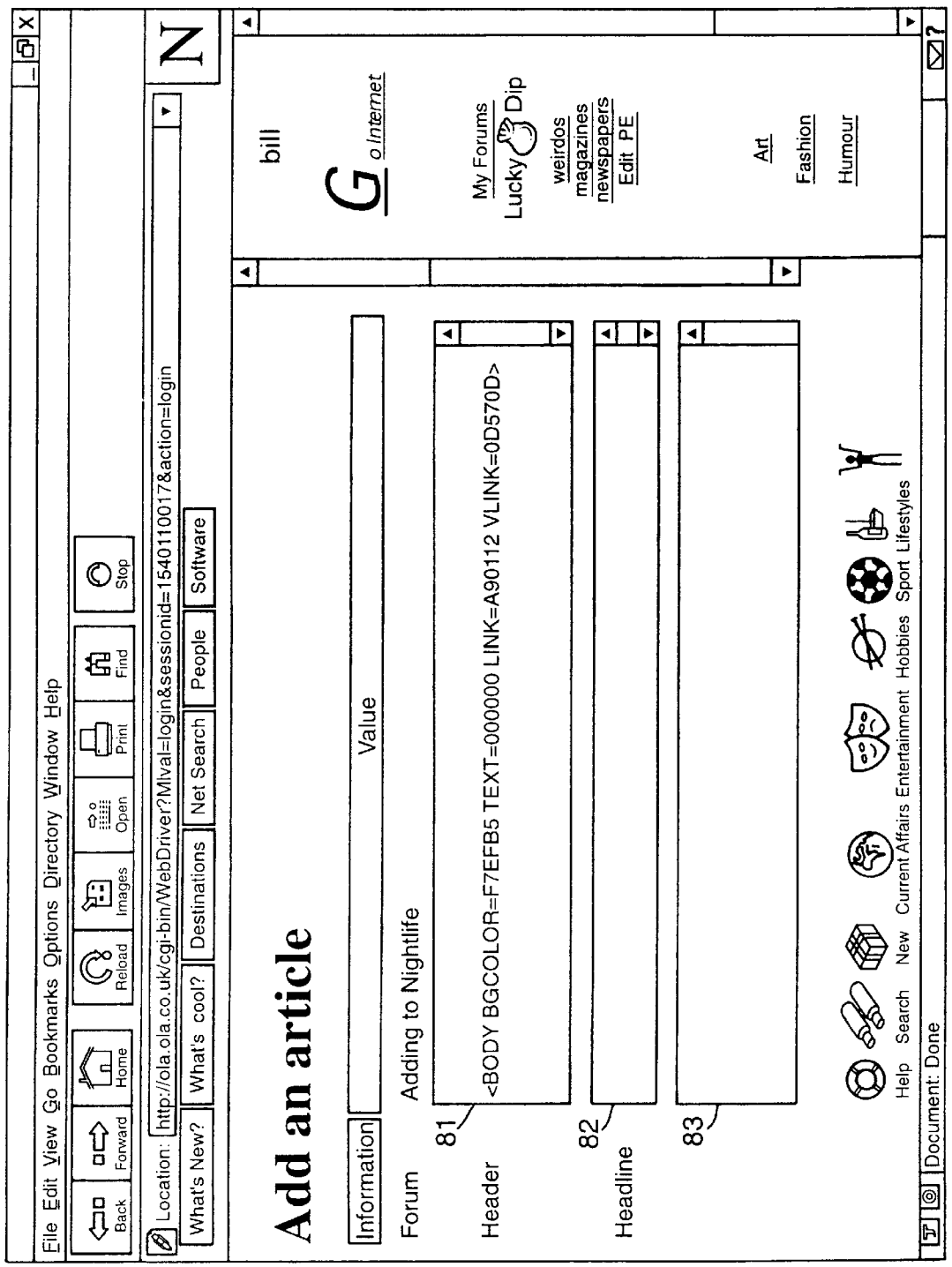
FIG. 12 is a view showing a screen allowing addition of a new article.

Selecting "Add new article" takes the content generator to the corresponding page, shown in FIG. 12. This comprises a form including boxes for the article Headline 82, the teaser or lead 83 and (not shown) the body text. The content generator may type into the boxes directly or, more likely, paste in text prepared on a word processor or HTML editor. A box 81 showing the default HTML header for the article is also provided. This defines such parameters as text and background colour for the article and may be edited if the content generator is sufficiently familiar with HTML.. Otherwise the defaults can be left, ensuring that the article has a standard "look and feel".

When an article is added to the database, the automatic content posting system automatically adds the article headline and teaser to the news page of the relevant forum together with a link to the full article. If the news page already contains the maximum number of links as specified by the forum administrator, the oldest article no longer appears on the news page. In the present embodiment articles are bumped strictly in order of age. It is however possible for the forum administrator to set more complex rules. For example, articles on the news page may be set to remain permanently or for a specified period. Also, content generators and articles may be given priorities and bumped according to those priorities.

If the number of articles on the news page falls below predetermined number, the automatic content posting system retrieves articles previously bumped or alerts the forum administrator.

The automatic content posting system also indexes each new article as necessary for the ola™ search tool.

In this manner the automatic content posting system automatically makes necessary entries in the forum archive and the forum homepage so that the article is immediately available to users. This is done without need for intervention by the forum administrator and without requiring knowledge of HTML and the system organisation on the part of the content generator.

What is claimed is:

1. A server computer for a data communication system adapted to transmit a document via a network to a client computer in response to a request therefrom; said server comprising:

article memory means for storing a plurality of article documents and respective bibliographic data;

selection rule storage means for receiving from a system administrator and storing an article document selection rule;

automatic document assembly means for retrieving from said article memory means a subset of said plurality of article documents and assembling a document from at least part of each of said subset of article documents, said subset of article documents being selected according to the respective bibliographic data using said article document selection rule; and transmission means responsive to said request for transmitting the assembled document onto said network for delivery to said client computer.

2. A server computer according to claim 1, wherein said bibliographic data includes date data representative of at least one of: the date of creation of the respective document; the date of last alteration of said respective document and the date said respective document was stored in said article memory means; and wherein said article document selection rule is to select the N most recent documents, N being a number set by said system administrator.

3. A server computer according to claim 1, wherein each said document comprises a title and a body text portion and said assembled document comprises the titles of each of said subset of article documents and a hypertext link to the respective article document.

4. A server computer according to claim 3 wherein at least one of said subset of article documents further comprises a précis text portion and said assembled document further comprises the précis text portion of each of said subset of article documents.

5. A server computer according to claim 3, wherein at least one of said article documents further comprises an image and said assembled document further comprises the image of each of said subset of article documents.

6. A server computer according to claim 1, wherein said automatic document assembly means comprises:
assembled document memory means for storing said assembled document; and
automatic update means responsive to the input of a new article document for storing said new article document in said article memory means, retrieving said assembled document from said assembled document memory means, amending said assembled document to include at least part of said new article document and storing the amended assembled document in said assembled document memory means.

7. A server computer according to claim 6 wherein said automatic update means is further adapted, when adding a part of a new article document and if the number of document titles included in said assembled document is equal to or greater than a number determined by said system administrator, to delete from said assembled document any part of a selected article document previously included in said assembled document, said selected article document being an article document indicated to be suitable for deletion according to a deletion rule.

8. A server computer according to claim 7 wherein said deletion rule is to delete any part of the oldest document previously included in said assembled document.

9. A server computer according to claim 7 wherein said deletion rule is set by said system administrator.

10. A server computer according to claim 1, wherein said automatic document assembly means is adapted to assemble said document in response to said request.

11. A server computer according to claim 1, wherein said bibliographic data includes data indicative of the author of each article document and said predetermined rule is dependant on the author of each article document.

12. A server computer according to claim 1, and adapted to communicate with said client computer via the Internet or an intranet.

13. A server computer according to claim 1, wherein said article documents and said assembled document are described in Hypertext Mark-up Language (HTML).

14. A server for a data communication system adapted to transmit a document via a network to a client computer in response to a request therefrom; said server comprising:

an article memory operative to store a plurality of article documents and respective bibliographic data;
processing circuitry configured to store an article document selection rule, and to retrieve from said article memory a subset of said plurality of article documents and assemble a document from at least part of said subset of article documents, said subset of article documents being selected according to the respective bibliographic data using said article document selection rule; and
transmission circuitry responsive to said request for transmitting the assembled document onto said network for delivery to said client computer.

15. The server according to claim 14, wherein said processing circuitry comprises a central processing unit operative to receive said article document selection rule from a system administrator.

16. The server according to claim 14, wherein said assembled document is a table of contents-type document comprising titles of each of said subset of article documents and a hypertext link to the respective article document.

17. A method for assembling a document in a server for delivery to a client via a network, comprising the steps of:
storing a plurality of articles and respective bibliographic data in memory;
storing an article document selection rule in memory;
selecting a subset of said stored plurality of article documents according to said article selection rule and the respective bibliographic data;
retrieving said selected subset of article documents and assembling a document from at least part of said subset of article documents; and
transmitting said assembled document onto said network for delivery to said client computer.

18. The method according to claim 17, further comprising receiving said article document selection rule from a system administrator prior to storing it in memory.

19. The method according to claim 17, wherein said assembled document is a table of contents-type document comprising titles of each of said subset of article documents and a hypertext link to the respective article document.

20. The method according to claim 17, further comprising the step of automatically updating said assembled document to responsive to an input of a new article.

21. A server computer for a data communication system adapted to transmit a digital content via a network to a client computer in response to a request therefrom; said server comprising:
contents memory means for storing a plurality of contents and respective bibliographic data;
selection rule storage means for receiving from a system administrator and storing a contents selection rule;
automatic contents assembly means for retrieving from said contents memory means a subset of said plurality of contents and assembling a content from at least part of each of said subset of contents, said subset of contents being selected according to the respective bibliographic data using said contents selection rule; and
transmission means responsive to said request for transmitting the assembled contents onto said network for delivery to said client computer.

22. A server for a data communication system adapted to transmit a digital content via a network to a client computer in response to a request therefrom, said server comprising:

a contents memory operative to store a plurality of contents and respective bibliographic data;

processing circuitry configured to store a contents selection rule, and to retrieve from said contents memory a subset of said plurality of contents and assemble a content from at least part of said subset of contents, said subset of contents being selected according to the respective bibliographic data using said contents selection rule; and transmission circuitry responsive to said request for transmitting the assembled content onto said network for delivery to said client computer.

23. A method for assembling a digital content in a server for delivery to a client via a network, comprising the steps of:

storing a plurality of contents and respective bibliographic data in memory;

storing a contents selection rule in memory;

selecting a subset of said stored plurality of contents according to said contents selection rule and the respective bibliographic data;

retrieving said selected subset of contents and assembling a content from at least part of said subset of contents; and transmitting said assembled content onto said network for delivery to said client computer.

* * * * *